United States Patent
Onabe et al.

(10) Patent No.: US 8,341,347 B2
(45) Date of Patent: Dec. 25, 2012

(54) STORAGE CONTROLLER

(75) Inventors: Kenji Onabe, Odawara (JP); Koji Arai, Odawara (JP); Tetsuya Shirogane, Odawara (JP)

(73) Assignee: Hitachi, Ltd., Tokyo (JP)

( * ) Notice: Subject to any disclaimer, the term of this patent is extended or adjusted under 35 U.S.C. 154(b) by 878 days.

(21) Appl. No.: 12/379,284

(22) Filed: Feb. 18, 2009

(65) Prior Publication Data

US 2010/0122027 A1   May 13, 2010

(30) Foreign Application Priority Data

Nov. 12, 2008 (JP) .................................. 2008-290069

(51) Int. Cl.
*G06F 12/00* (2006.01)
(52) U.S. Cl. ................. 711/112; 711/114; 711/E12.001
(58) Field of Classification Search .................. None
See application file for complete search history.

(56) References Cited

U.S. PATENT DOCUMENTS

| | | | |
|---|---|---|---|
| 7,783,857 B2 * | 8/2010 | Fuse et al. ..................... | 711/203 |
| 2006/0028805 A1 | 2/2006 | Hidaka | |
| 2007/0002847 A1 | 1/2007 | Inamura et al. | |
| 2008/0005514 A1 | 1/2008 | Kurokawa et al. | |
| 2008/0126696 A1 * | 5/2008 | Holland et al. ............... | 711/114 |
| 2008/0189445 A1 | 8/2008 | Hada et al. | |
| 2008/0204920 A1 | 8/2008 | Muramatsu et al. | |
| 2009/0083581 A1 * | 3/2009 | Sauber ............................ | 714/37 |

FOREIGN PATENT DOCUMENTS

| | | |
|---|---|---|
| JP | 09-006547 | 1/1997 |
| JP | 11-328088 | 11/1999 |
| JP | 2007-11682 | 6/2005 |
| JP | 2006-294201 | 10/2006 |
| JP | 2007-328408 | 12/2007 |
| JP | 2008-191989 | 8/2008 |
| JP | 2008-243177 | 10/2008 |
| WO | WO 2008/097907 A2 | 8/2008 |

OTHER PUBLICATIONS

Notification of Reason(s) for Refusal Office Action issued by the Japanese Patent Office on Mar. 1, 2011 in Patent Application No. 2008-290069 (4 pages) with a partial English language translation (2 pages).

* cited by examiner

*Primary Examiner* — Sanjiv Shah
*Assistant Examiner* — Thanh D Vo
(74) *Attorney, Agent, or Firm* — Stites & Harbison, PLLC; Juan Carlos A. Marquez, Esq

(57) ABSTRACT

A storage controller of the present invention enables a larger number of storage devices to be mounted while keeping the installation size small. A plurality of sub-storage units are disposed inside a high density-type storage unit. The respective sub-storage units comprise a plurality of hard disk drives, controller, memory, power supply device, and display part. The respective sub-storage units operate independently of one another. A controller creates a management table based on management data acquired from the respective sub-storage units. The user is notified when there is an error in the table contents. A display part lights up in accordance with an indication from a storage unit specification part, notifying the user of the location of the sub-storage unit.

11 Claims, 28 Drawing Sheets

STORAGE UNIT MANAGEMENT TABLE

| UNIT# | SAS ADDRESS | MANUFACTURER NUMBER | PAIR# | SUB-STORAGE UNIT TYPE | VALIDATION FLAG |
|---|---|---|---|---|---|
| C10 | C11 | C12 | C13 | C14 | C15 |
| 0 | Adr0 | 8000000001 | 0 | L | OK |
| 1 | Adr1 | 8000000001 | 0 | R | OK |
| 2 | Adr2 | 3000000001 | — | — | OK |
| 3 | Adr3 | 8000000002 | 1 | L | OK |
| 4 | Adr4 | 8000000002 | 1 | R | OK |

FIG. 19

STORAGE UNIT MANAGEMENT TABLE T10

| UNIT# (C10) | SAS ADDRESS (C11) | MANUFACTURER NUMBER (C12) | PAIR# (C13) | SUB-STORAGE UNIT TYPE (C14) | VALIDATION FLAG (C15) |
|---|---|---|---|---|---|
| 0 | Adr0 | 8000000001 | 0 | L | OK |
| 1 | Adr1 | 8000000001 | 0 | R | OK |
| 2 | Adr2 | 3000000001 | — | — | OK |
| 3 | Adr3 | 8000000002 | 1 | L | OK |
| 4 | Adr4 | 3000000002 | — | — | NG |
| 5 | Adr5 | 8000000003 | 1 | R | NG |

FIG. 22

STORAGE UNIT MANAGEMENT TABLE — T10

| UNIT# (C10) | SAS ADDRESS (C11) | MANUFACTURER NUMBER (C12) | PAIR# (C13) | SUB-STORAGE UNIT TYPE (C14) | VALIDATION FLAG (C15) |
|---|---|---|---|---|---|
| 0 | Adr0 | — | — | L | NG |
| 1 | Adr1 | — | — | R | NG |
| 2 | Adr2 | 3000000001 | — | — | OK |
| 3 | Adr3 | 8000000002 | 1 | L | OK |
| 4 | Adr4 | 8000000002 | 1 | R | OK |

STORAGE CONTROLLER

CROSS-REFERENCE TO RELATED APPLICATIONS

This application relates to and claims priority from Japanese Patent Application No. 2008-290069 filed on Nov. 12, 2008, the entire disclosure of which is incorporated herein by reference.

BACKGROUND OF THE INVENTION

1. Field of the Invention

The present invention relates to a storage controller.

2. Description of the Related Art

A storage controller is an apparatus that provides a host computer (hereinafter "host") with a relatively large capacity storage area. The storage controller, for example, uses a plurality of hard disk drives to construct a storage area based on RAID (Redundant Array of Independent Disks). A logical volume, which is a logical storage area, is configured on the physical storage areas of the respective hard disk drives. The host can carry out the reading and writing of data from and to the logical volume.

Now then, a storage controller that daisy chains together a main case, which is in charge of control functions, and an expansion case, which is in charge of storage functions, is known (JP-A-2007-011682). A controller and a plurality of hard disk drives is mounted in the main case, and a plurality of hard disk drives is mounted in the expansion case.

In the prior art storage controller, the user can expand the storage capacity of the storage controller by adding an expansion case as needed. However, adding more expansion cases enlarges the size of the storage controller.

SUMMARY OF THE INVENTION

With the foregoing in view, an object of the present invention is to provide a storage controller that makes it possible to provide more storage capacity without enlarging the installation size. Other objects of the present invention should become clear from the description of the embodiments explained hereinbelow.

To solve for the above-mentioned problem, a storage controller according to a first aspect of the present invention is a storage controller that comprises a controller and a plurality of storage units that are controlled by this controller, wherein the controller comprises a plurality of communication parts for communicating with the respective storage units respectively, and at least one of the respective storage units is configured as a first type storage unit, which comprises a casing and a plurality of sub-storage units, which are disposed in this casing and operate independently of one another, and the respective sub-storage units each comprise a plurality of storage devices, a unit control part that is in charge of communicating with these respective storage devices and the communication parts, and a power supply device that supplies power to the respective storage devices and the unit control part.

In a second aspect according to the first aspect, casing management data that is configured in casing units for managing a casing, address data that is configured in sub-storage unit units for the controller to carry out communications with the unit control part, and differentiation data for differentiating between the sub-storage units in a casing are respectively stored in each sub-storage unit.

In a third aspect according to the second aspect, the controller determines that a plurality of sub-storage units responding to the same casing management data are sub-storage units belonging to the same casing, and manages these sub-storage units as a group.

In a fourth aspect according to either the second or third aspects, the differentiation data is stored in association with the casing management data.

In a fifth aspect according to any of the second through the fourth aspects, unique casing management data configured for a first-type storage unit is selected from among data prepared beforehand as casing management data to be configured for the first-type storage unit.

In a sixth aspect according to any of the second through the fifth aspects, unique address data configured for the first-type storage unit is selected from among data prepared beforehand as address data to be configured in the first-type storage unit.

In a seventh aspect according to any of the first through the sixth aspects, the respective communication parts are daisy chained together with the respective storage units, and the controller manages the storage units by setting management numbers in ascending order from the storage unit that is located closest to the controller in the daisy chain connection.

In an eighth aspect according to any one of the second through the sixth aspects, the controller manages the sub-storage units by uniquely specifying a sub-storage unit based on a set of data comprising casing management data, address data and differentiation data acquired from the sub-storage unit, and, in addition, by making a management number correspond to the sub-storage unit specified by the set of data.

In a ninth aspect according to the eighth aspect, the controller determines whether or not the sets of data acquired from the respective sub-storage units daisy chained together at the current startup coincides with the sets of data acquired at the previous startup, and outputs a warning when the sets of data acquired at the current startup do not coincide with the sets of data acquired at the previous startup.

In a tenth aspect according to the eighth aspect, when a new storage unit is connected, the controller determines whether or not this new storage unit is located at the end of the daisy chain connection, and outputs a warning when this new storage unit is not located at the end of the daisy chain connection, and, in addition, when this new storage unit is a sub-storage unit located at the end of the daisy chain connection, carries out management and storage by adding a new management number that is consecutive with the current management number to the set of data acquired from this sub-storage unit.

In an eleventh aspect according to any of the second through the sixth aspects, when a new storage unit is connected, the controller makes a first determination as to whether or not the address data acquired from this new storage unit duplicates the address data of another storage unit, makes a second determination as to whether or not the casing management data and differentiation data acquired from this new storage unit duplicate the casing management data and differentiation data of another storage unit, and, in addition, makes a third determination as to whether or not the differentiation data acquired from this new storage unit has continuity with the storage unit that is connected at the end of the daisy chain connection from among the existing storage units from the standpoint of the arrangement of the sub-storage units in the casing, and outputs a warning when an affirmative determination result is not obtained for any of either the first determination, the second determination or the third determination.

In a twelfth aspect according to any of the second through the tenth aspects, the casing management data, address data and differentiation data are redundantly stored in plurality of different storage areas, and when the plurality of casing management data respectively read out from the plurality of storage areas do not match, the unit control part determines the casing management data in accordance with majority rule.

In a thirteenth aspect according to any of the first through the twelfth aspects, a plurality of display parts corresponding to the respective sub-storage units are provided respectively in the casing of the first-type storage unit, and the unit control part activates the display part that corresponds to the sub-storage unit specified by the controller from among the respective display parts.

In a fourteenth aspect according to any of the first through the thirteenth aspects, the plurality of storage units comprises at least one second-type storage unit that differs from the first-type storage unit, and the second-type storage unit comprises a casing, a plurality of storage devices disposed in this casing, a unit control part, which is disposed in the casing and is in charge of communications between the respective storage devices and communication parts, and a power supply device for supplying power to the respective storage devices and the unit control part.

A storage controller according to a fifteenth aspect is a storage controller that comprises a controller and a plurality of storage units controlled by this controller, wherein the controller comprises a plurality of communication parts for communicating with the respective storage units, and a storage part for storing a management table for managing the respective storage units, for the controller the respective storage units are daisy chained so as to be distributed evenly for the respective communication parts, and, in addition, the controller sets consecutive management numbers to the storage units in accordance with a connection sequence, each storage unit comprises a casing and a plurality of sub-storage units, which are disposed in this casing and operate independently of one another, each sub-storage unit comprises a plurality of storage devices, a unit control part that is in charge of communications between these respective storage devices and the communication parts, and a power supply device for supplying power to the respective storage devices and the unit control part, the unit control part comprises a plurality of different memories, casing management data that is configured in casing units for managing a casing, address data that is configured in respective sub-storage unit units for the controller to carry out communications with the unit control part, and differentiation data that differentiates between the respective sub-storage units in a casing are respectively stored as prescribed data, and when the prescribed data respectively read out from the memories do not match, the respective unit control parts determine this data in accordance with majority rule, and when the storage controller starts up and a new storage unit is added and connected, the controller creates a management table by respectively acquiring the prescribed data in order beginning with the unit control part of the storage unit connected closest to the controller in terms of connections, checks the created management table on the basis of prescribed rules, and carries out error processing when the management table is in violation of the prescribed rules, and furthermore, when the storage controller starts up, the controller either checks the management table on the basis of the prescribed rules after management table creation of has been completed, or checks on the basis of the prescribed rules the management table each time prescribed data is acquired from the respective unit control parts and stored in the management table when a new storage unit is added and connected, and the prescribed rules at least comprise (1) that the respective management numbers of the respective storage units be in consecutive order from a minimal value; (2) that the respective sub-storage units inside the same storage unit have consecutive management numbers; and (3) that the respective sub-storage units inside the same storage unit be connected in a prescribed order.

BRIEF DESCRIPTION OF THE DRAWINGS

FIG. 11 is an illustration showing a table for managing a storage unit;

FIG. 19 is an illustration of a management table comprising a different error;

FIG. 22 is an illustration showing a management table when a manufacturer number could not be acquired;

DESCRIPTION OF THE PREFERRED EMBODIMENTS

Figure 1:
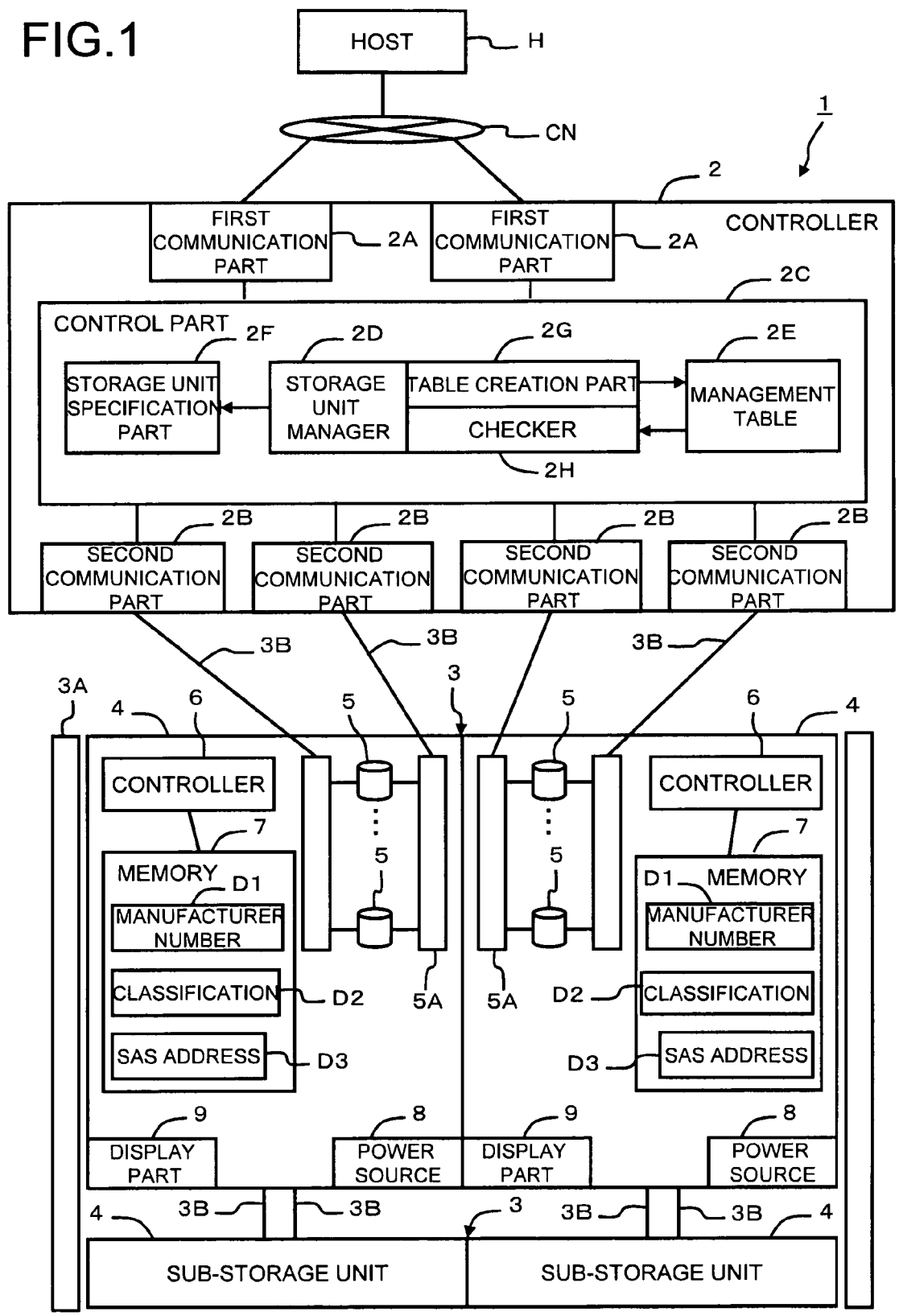
FIG. 1 is an illustration showing an overview of an embodiment of the present invention.

The embodiment of the present invention will be explained below on the basis of the drawings. FIG. 1 is an illustration showing an overview of this embodiment. A more detailed configuration will become clear from the embodiments explained hereinbelow. In this embodiment, a plurality of sub-storage units 4 is disposed inside one storage unit 3. Mounting to a rack 3A and removal from the rack 3A are carried out in storage unit 3 units. Connection to a controller 2 is carried out in sub-storage unit 4 units. That is, the respective sub-storage units 4 can each be used independently.

The storage controller 1 shown in FIG. 1 comprises a controller 2 and a plurality of storage units 3. The controller 2 is for controlling the operation of the storage controller 1, and, for example, comprises a first communication part 2A, a second communication part 2B and a control part 2C. The first communication part 2A is a communication control circuit for communicating with a host H. The first communication part 2A, for example, carries out communications with the host H by way of a communication protocol, such as FCP (Fibre Channel Protocol) or iSCSI (internet Small Computer System Interface). The second communication part 2B corresponds to the "controller communication part," and is a communication control circuit for communicating with respective hard disk drives 5 inside the respective storage units 3. The second communication part 2B is connected to the respective sub-storage units 4 inside a storage unit 3 by way of a fibre-optic cable or other such cable 3B.

The control part 2C controls the operation of the controller 2. The control part 2C comprises a storage unit manager 2D, a management table 2E, and a storage unit specification part 2F. The storage unit manager 2D uses the management table 2E to manage the configuration of the storage controller 1. The storage unit manager 2D comprises a table creation part 2G for creating the management table 2E, and a checker 2H for checking the created management table 2E.

The management table 2E is a table that correspondently manages a manufacturer number D1 configured for each storage unit 3, a classification D2 for differentiating the respective sub-storage units 4, and a SAS (Serial Attached SCSI) address D3 for accessing the respective sub-storage units 4.

When the storage controller 1 starts up, and when a new storage unit 3 is added to the storage controller 1, the table creation part 2G ascertains the configuration of the storage controller 1, and either creates or updates the management table 2E. The checker 2H compares the contents of the management table 2E against prescribed rules, and checks whether or not the contents of this management table 2E coincide with the prescribed rules. The checker 2H outputs an error message when the contents of the management table 2E violate the prescribed rules.

Figure 13:
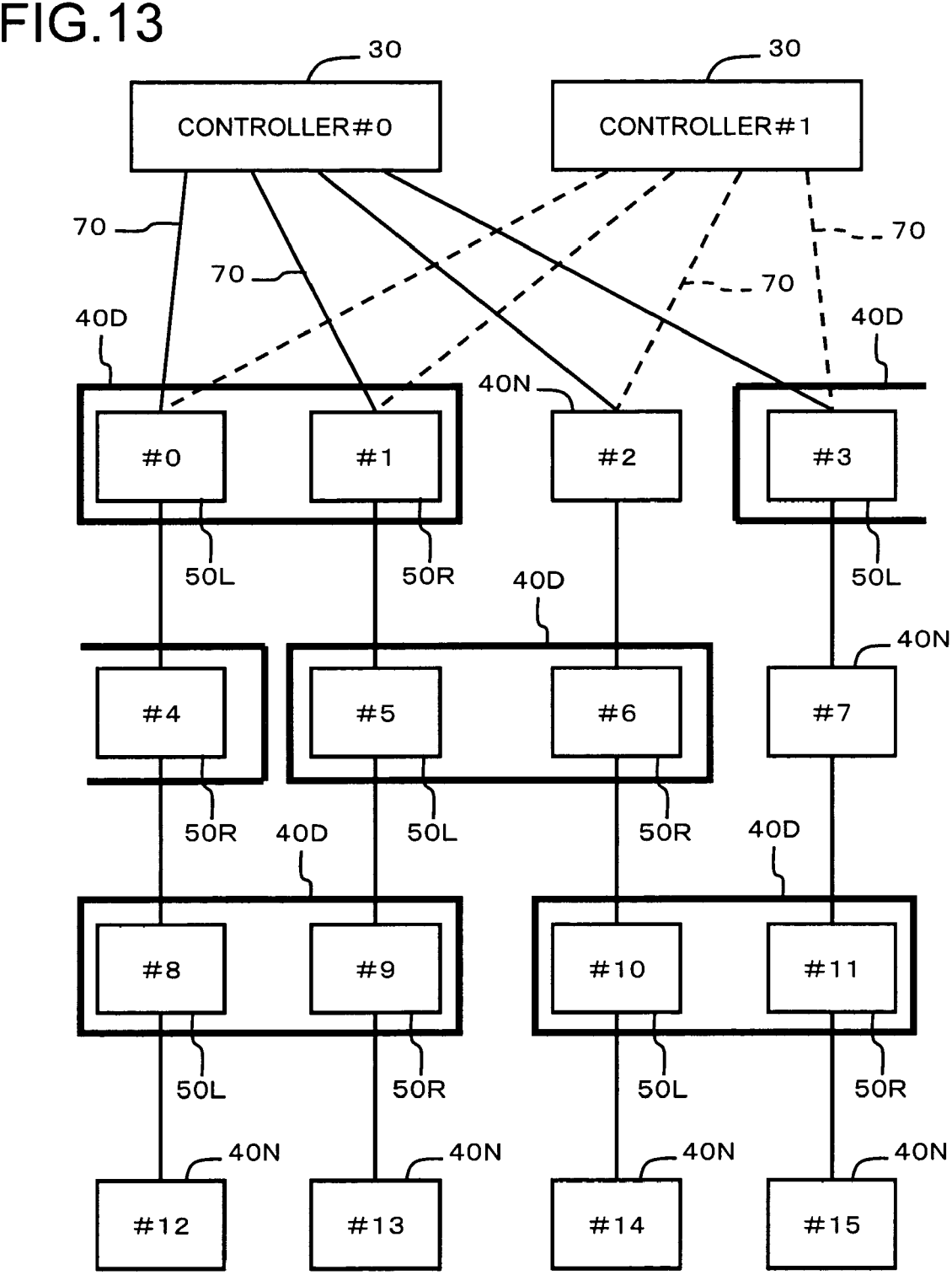
FIG. 13 is an illustration showing how a normal storage unit and a storage unit of the present invention are utilized together.

The storage unit 3 is detachably mounted to the rack 3A. A plurality of (for example, two) sub-storage units 4 is disposed inside the storage unit 3. A storage unit 3 comprising a plurality of sub-storage units 4 can be called a high-density storage unit. A high-density storage unit corresponds to the "first-type storage unit." By contrast, a storage unit that does not comprise a sub-storage unit 4 can be called a normal storage unit. A normal storage unit corresponds to the "second-type storage unit." Although omitted from FIG. 1, a high-density storage unit 3 and a normal storage unit can be mixed and used together as shown in FIG. 13 described hereinbelow.

The respective sub-storage units 4, for example, comprise a hard disk drive 5, a bus expander (hereinafter, expander) 5A, a sub-unit internal controller 6, a memory 7, a power supply device 8, and a display part 9.

The hard disk drive 5, which serves as the "storage device," is connected to the second communication part 2B by way of the expander 5A and a cable 3B. For example, a FC (Fibre Channel) disk, SCSI (Small Computer System Interface) disk, SATA disk, ATA (AT Attachment) disk, SAS (Serial Attached SCSI) disk and so forth can be used as the hard disk drive 5. Furthermore, instead of a hard disk drive, it is also possible to use another device that is capable of reading and writing data, such as a semiconductor memory device, an optical disk device, a magneto-optical disk device, or a magnetic tape device. As a semiconductor memory device, for example, a flash memory, FeRAM (Ferroelectric Random Access Memory), MRAM (Magnetoresistive Random Access Memory), Ovonic Unified Memory, and RRAM (Resistance RAM) can be cited.

The sub-unit internal controller (hereinafter, controller) 6 controls the operation of the sub-storage unit 4. The memory 7, for example, stores a program to be executed by the controller 6, and management data D1 through D3. The respective data D1 through D3 is configured when the storage unit is shipped from the plant.

The manufacturer number D1 is identification information for specifying the storage unit 3, and is configured for each of the respective storage units 3. The classification D2 is information for differentiating between the plurality of sub-storage units 4 inside a single storage unit 3. The classification D2, for example, shows where each sub-storage unit 4 is located inside the storage unit 3, such as front or back, or left or right. The SAS address D3 is address information for the second communication part 2B to access the sub-storage unit 4.

The power supply device 8 is a device for supplying a prescribed power to the respective hard disk drives 5, controller 6, memory 7, and display part 9. The display part 9, for example, comprises a light-emitting element such as an LED (light Emitting Diode) lamp. A lit display part 9 makes it possible to check the storage unit 3 from the outside.

In a storage controller 1 configured like this, a plurality of sub-storage units 4 is disposed inside one high-density storage unit 3, making it possible to mount a larger number of hard disk drives 5.

The sub-storage units 4 respectively comprise a hard disk drive 5, controller 6, memory 7, and power supply device 8, and operate independently. The controller 2 can treat the respective sub-storage units 4 as a storage unit 3, and can send and receive data to and from the respective sub-storage units 4. Therefore, the high-density storage unit 3 can be used without significantly changing the computer program of the controller 2. This embodiment will be explained in detail below using FIG. 2 and the subsequent drawings.

First Embodiment

This embodiment will be explained using FIGS. 2 through 27. The corresponding relationship with FIG. 1 will be explained first. Storage controller 10 corresponds to the storage controller 1 of FIG. 1, rack 11 corresponds with the rack 3A of FIG. 1, control unit 20 corresponds to the controller 2 of FIG. 1, storage unit 40 corresponds to the storage unit 3 of FIG. 1, sub-storage unit 50 corresponds to the sub-storage unit 4 of FIG. 1, and hard disk drive 51 corresponds to the hard disk drive 5 of FIG. 1. Protocol chip 31 corresponds to the first communication part 2A of FIG. 1, SAS protocol chip 32 corresponds to the second communication part 2B of FIG. 1, and CPU 35 and memory 36 correspond to the control part 2C of FIG. 1. Expander 520 corresponds to the expander 5A of FIG. 1, controller 52 corresponds to the controller 6 of FIG. 1, flash memory 523 corresponds to the memory 7 of FIG. 1, lamp 57 corresponds to the display part 9 of FIG. 1, power supply device 55 corresponds to the power supply device 8 of FIG. 1, host 60 corresponds to the host H of FIG. 1, and communication network CN 10 corresponds to the communication network CN of FIG. 1.

Figure 2:
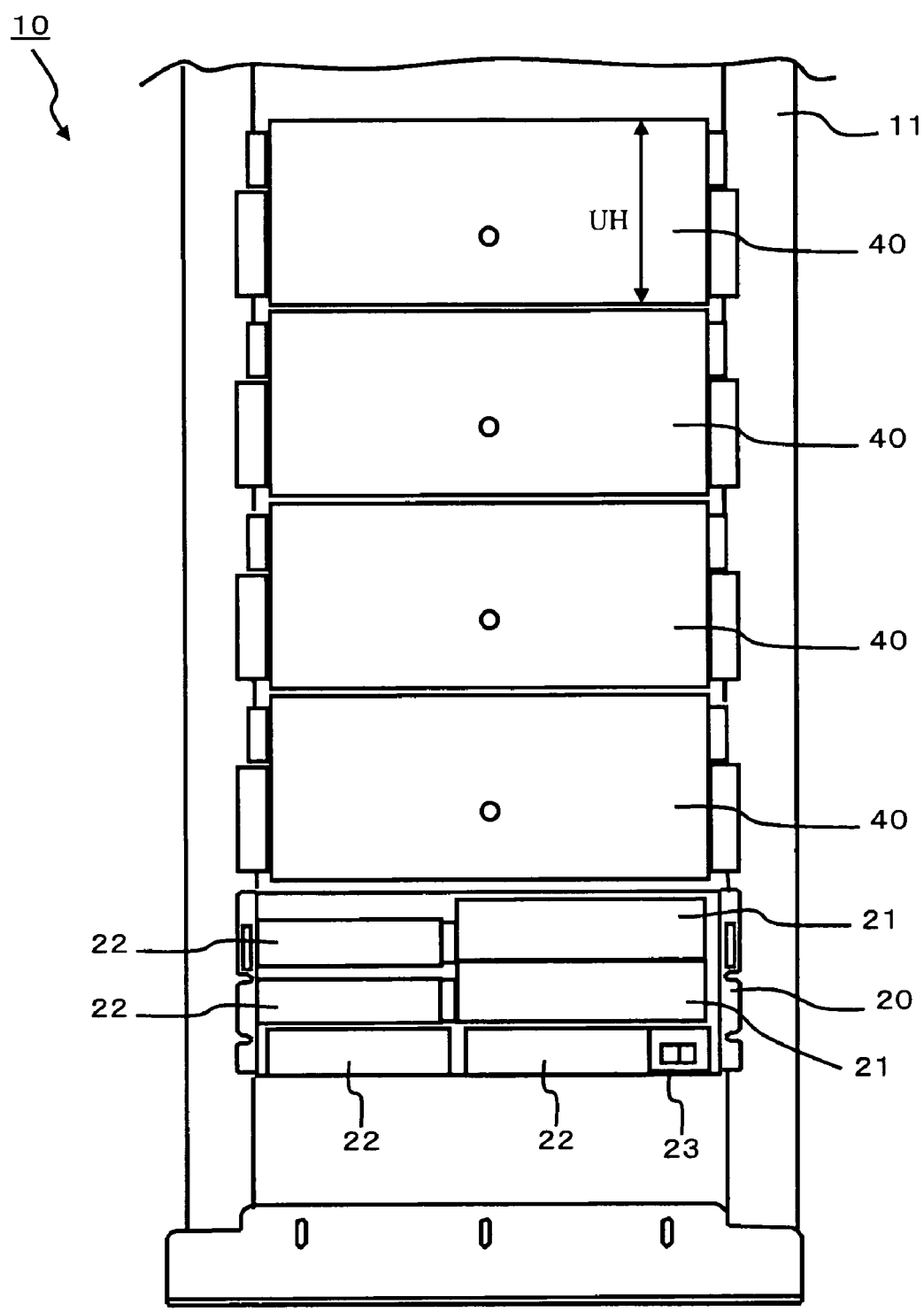
FIG. 2 is a front view of a storage controller as seen from the front.

FIG. 2 is a front view of the storage controller 10. For example, a single control unit 20 and a plurality of storage units 40 are detachably mounted in the rack 11, which is configured as a 19-inch rack.

The control unit 20 is a device for controlling the storage controller 10, and, for example, is mounted at the bottom of the rack 11. The configuration of the control unit 20 will be explained below using FIG. 7. Confining the explanation to the scope displayed in FIG. 2, the control unit 20, for example, comprises a plurality of cooling fans 21, a plurality of battery devices 22, and a main switch 23, in addition to a controller 30 that will be explained below. The cooling fan 21 cools the control unit 20. The battery device 22 supplies battery power to the control unit 20 and respective storage units 40 when there is a power outage. The main switch 23 is the switch for starting up the storage control apparatus 10.

A plurality of storage units 40 is detachably mounted in the rack 11 above the control unit 20. The storage units 40 comprise high-density storage units and normal storage units. High-density storage unit signifies a storage unit comprising a plurality of sub-storage units 50 thereinside, and will be assigned the reference numeral 40D. Normal storage unit signifies a storage unit that does not comprise a sub-storage unit, and will be assigned the reference numeral 40N. Reference numeral 40 will be used when there is no particular need to differentiate between a high-density storage unit and a low density-type storage unit.

The high-density storage unit 40D, for example, can be mounted with a total of 48 hard disk drives 51, 24 each on the left and right, and the height dimension thereof UH, for example, is 4U. The normal storage unit 40N, for example, can be mounted with around 15 hard disk drives, and the height dimension thereof, for example, is 3U. One U (1U) is 44.45 mm (1.77 inches). In the following description, the explanation will focus on the high-density storage unit 40D, which is the featured configuration in this embodiment.

Figure 3:
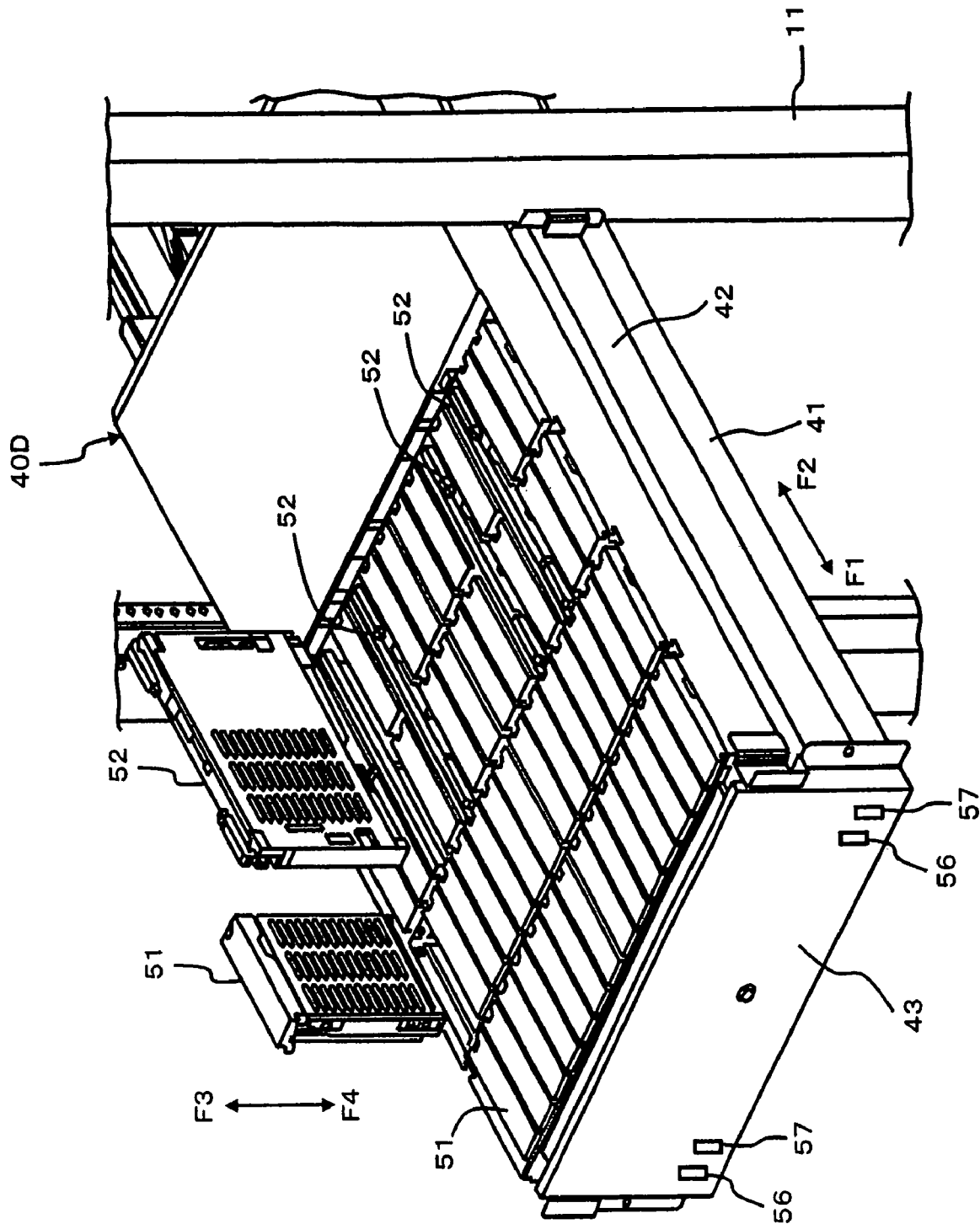
FIG. 3 is an oblique view showing an enlarged storage unit.

FIG. 3 is an oblique view of a high-density storage unit 40D. The high-density storage unit 40D, for example, comprises a box-shaped case 41, a plurality of hard disk drives 51 and a plurality of enclosures 52 detachably disposed inside the case 41, and a power source lamp 56 and a location display lamp 57 disposed on the front side 43 of the case 41. The enclosure 52 will be explained further below.

Rails 42 are disposed on both sides of the case 41. The high-density storage unit 40D is movably mounted to the rack 11 by way of the rails 42. For example, when replacing a hard disk drive 51 or the like, the user pulls out the case 41 in the direction of arrow F1, and removes the hard disk drive 51 in the direction of arrow F3. The user can also mount a hard disk drive 51 in the direction of arrow F4, and return the case 41 to the inside of the rack 11 by pushing the case 41 in the direction of arrow F2.

Figure 4:
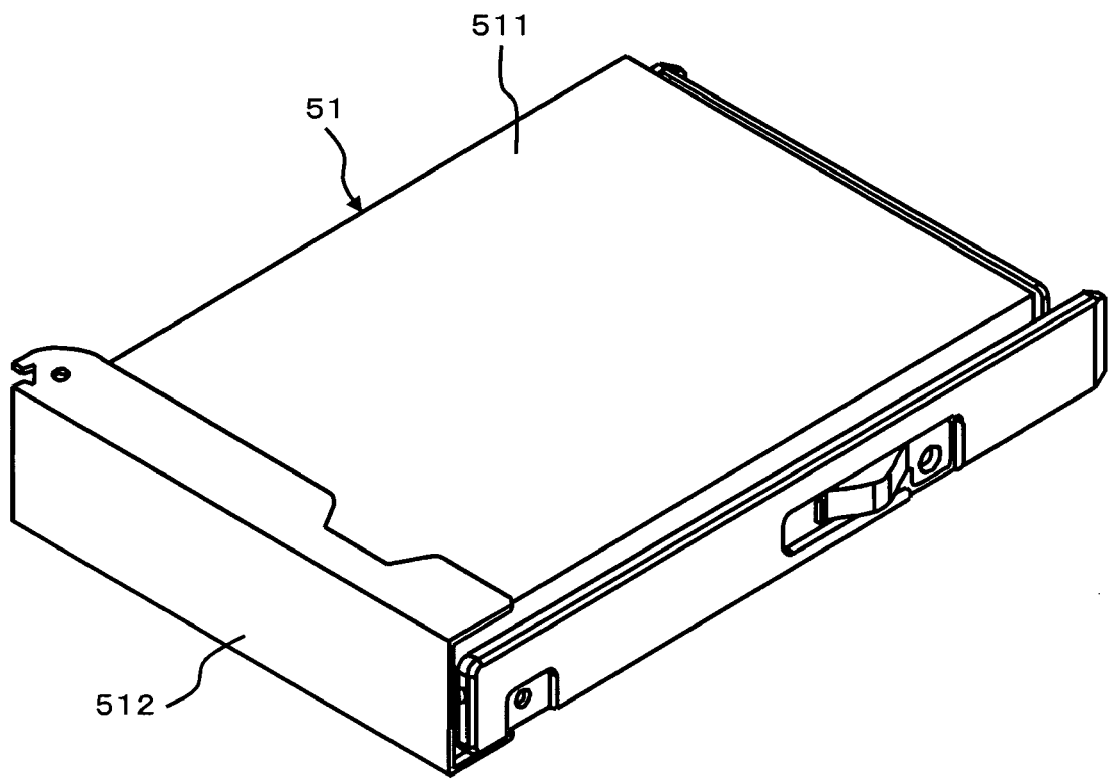
FIG. 4 is an oblique view showing an enlarged hard disk drive.

FIG. 4 is an external view of the hard disk drive 51. The hard disk drive 51 is configured from a drive main body 511 and a canister 512 for housing the drive main body 511. The canister 512 does not cover the entire surface of the drive main body 511, but rather is formed so as to cover only a portion of the surface of the drive main body 511.

Figure 5:
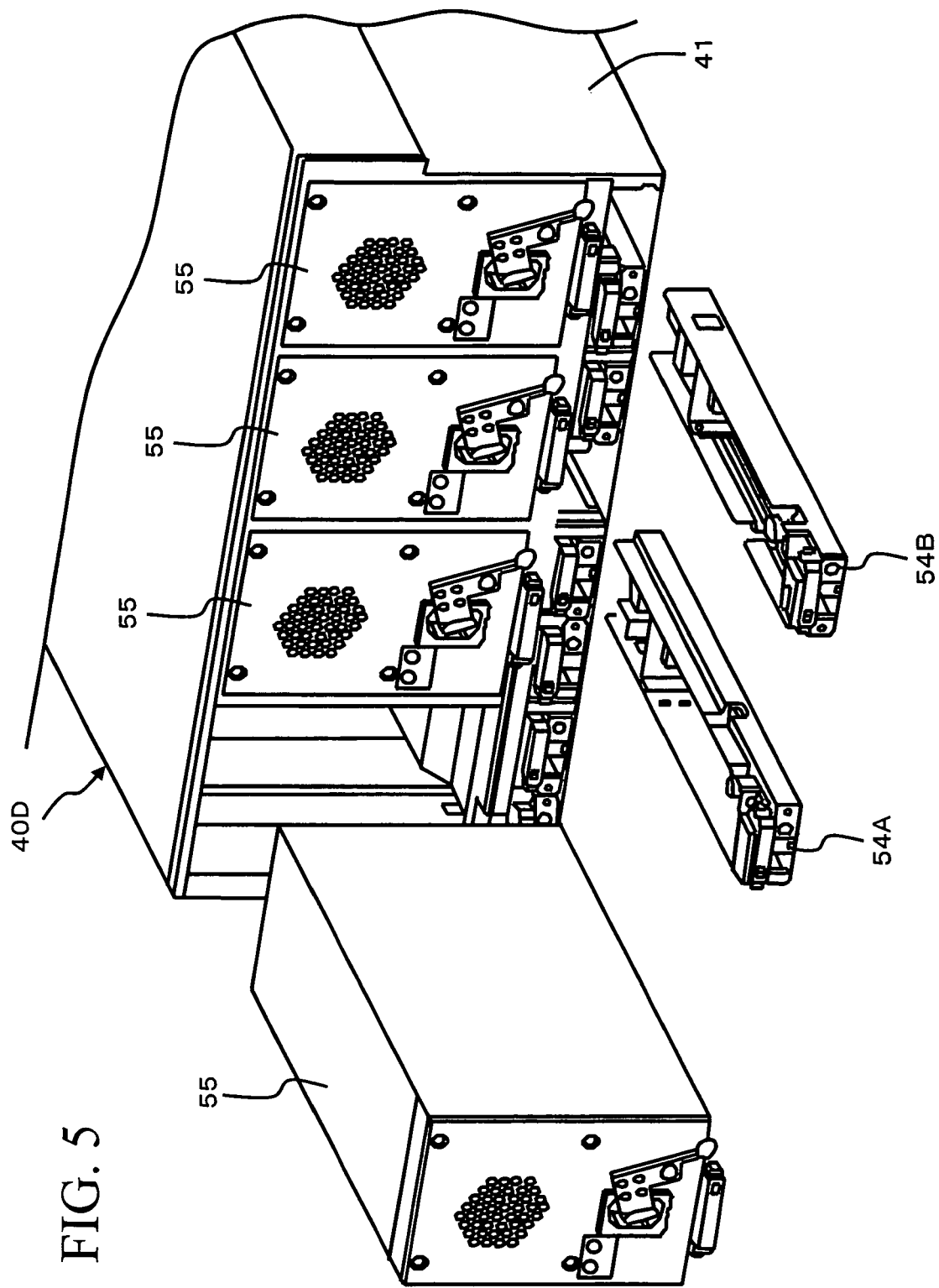
FIG. 5 is an oblique view of a storage unit seen from the rear side.

FIG. 5 is an oblique view of the high-density storage unit 40D as seen from the rear side. A plurality of (for example, four) power supply devices 55 is detachably disposed in the posterior of the high-density storage unit 40D.

Furthermore, cable holders 54A, 54B (hereinafter, will be called cable holder 54 when there is no particular need to differentiate between the two) are detachably disposed below the respective power supply devices 55. A cable 70 (refer to FIG. 7) is detachably mounted in the cable holder 54. An input signal cable 70 is mounted in the one cable holder 54A. An output signal cable 70 is mounted in the other cable holder 54B.

A cable 70 can be attached to a connector of an enclosure 52 by mounting a cable 70 in the respective cable holders 54, and inserting the cable holder 54 mounted with this cable 70 inside the case 41.

Figure 6:
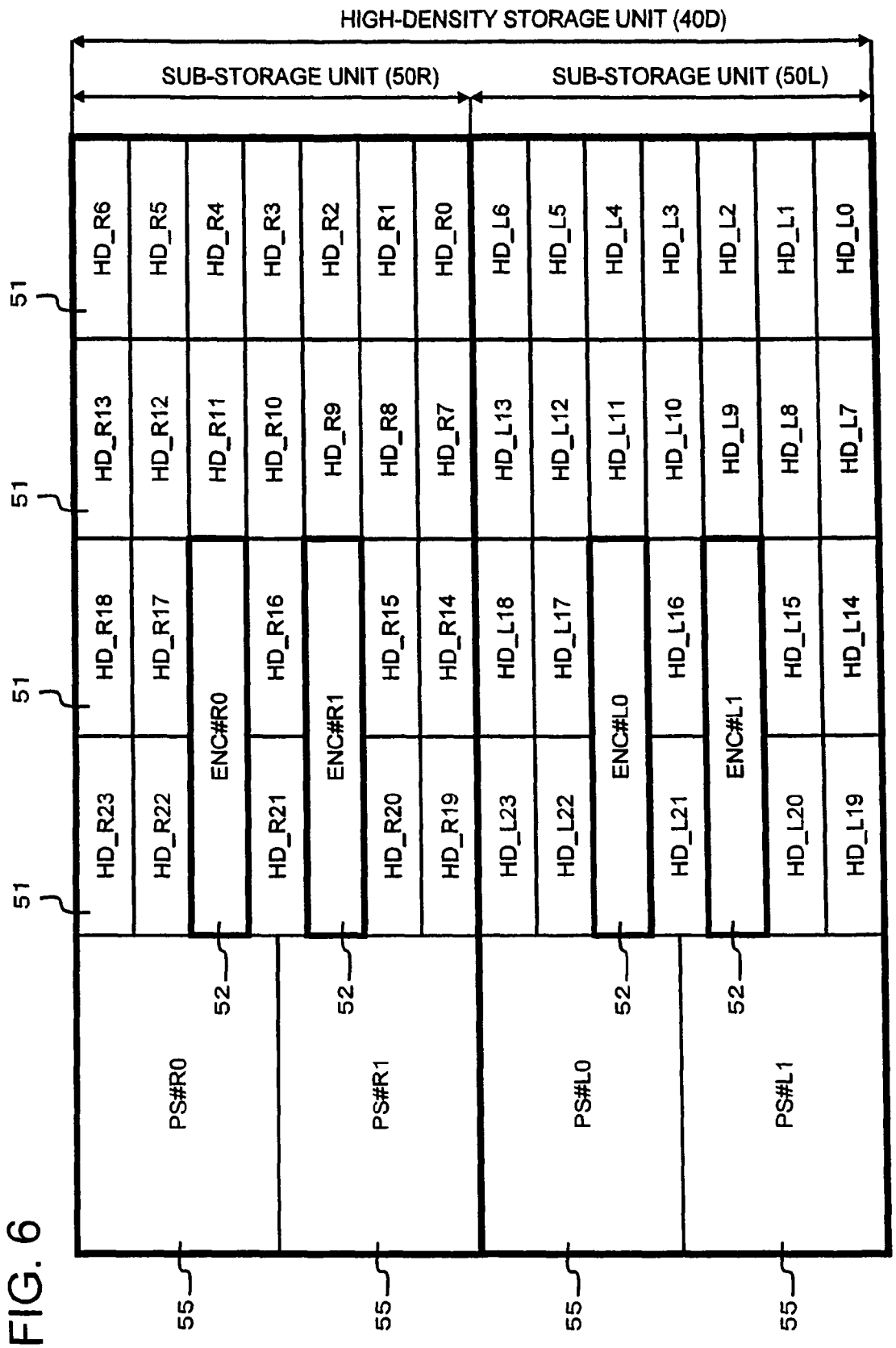
FIG. 6 is an illustration showing the accommodation status of hard disk drives and enclosures inside a storage unit.

FIG. 6 is a diagram of the case 41 with the cover removed as seen from directly above. Sub-storage units 50L and 50R are disposed on the left and right inside the case 41 of the high-density storage unit 40D.

The left-side sub-storage unit 50L is disposed on the left side as seen from the front side 43, and the right-side sub-storage unit 50R is disposed on the right side as seen from the front side 43. That is, the respective sub-storage units 50L, 50R are disposed symmetrically by dividing the case 41 left and right in the width direction. Furthermore, in the following explanation, the sub-storage units 50L, 50R will be called sub-storage unit 50 when there is no need to differentiate between left and right.

The right side of FIG. 6 is the front side of the high-density storage unit 40D where a plurality of hard disk drives 51 is shown. The left side of FIG. 6 is the posterior of the high-density storage unit 40D where a plurality of power supply devices 55 is disposed.

The explanation will focus on the left-side sub-storage unit 50L. Identification numbers are respectively configured for each of the hard disk drives 51 in the sub-storage unit 50L. The identification numbers are configured such that the values sequentially become larger from the left side facing the sub-storage unit 50L.

Hard disk drives 51 are disposed in a total of four rows in the sub-storage unit 50L from the anterior to the posterior thereof. The first row is configured from a total of seven hard disk drives 51 L#0 through L#6, and the second row is configured from a total of seven hard disk drives 51 L#7 through L#13. The third row is configured from a total of five hard disk drives 51 L#14 through L#18, and the fourth row is configured from a total of five hard disk drives 51 L#19 through L#23.

In the third and fourth rows, enclosures 52 (L#0), 52 (L#1) are disposed between the hard disk drives 51. Specifically, enclosure 52 (L#1) is disposed between hard disk drive 51 (L#15) and hard disk drive 51 (L#16) and hard disk drive 51 (L#20) and hard disk drive 51 (L#21). Similarly, enclosure 52 (L#0) is disposed between hard disk drive 51 (L#16) and hard disk drive 51 (L#17) and hard disk drive 51 (L#21) and hard disk drive 51 (L#22).

Because enclosures 52 are disposed in the third and fourth rows like this, there are two less drives in the third row and the fourth row than there are in the first row and second row.

If the respective enclosures 52 could be disposed in the first row and second row, there would be two fewer drives in the first row and second row than there were in the third row and fourth row. However, a configuration such as this would make the distance from the rear side of the case 41 to the enclosures 52 too long. As was explained using FIG. 5, the cable 70 is connected to the enclosure 52 by mounting the cable 70 in the cable holder 54 and inserting the cable holder 54 inside the case 41 from the bottom of the posterior of the case 41. Therefore, it is preferable that the enclosure 52 be installed in the posterior of the case 41 as much as possible.

Conversely, the power supply device 55 is disposed in the extreme posterior of the case 41 so as to be able to pull the power supply device 55 out from the posterior of the case 41 as shown in FIG. 5. Therefore, the enclosure 52 is located more toward the anterior of the case 41 than the power supply device 55 and disposed substantially in the center of the case 41. As for the relationship with the group of hard disk drives 51, the enclosure 52 is disposed in the middle of the posterior rows (third row and fourth row) of the hard disk drives 51.

The preceding is the configuration of the left-side sub-storage unit 50L. Since the right-side sub-storage unit 50R is configured the same as the left-side sub-storage unit 50L, this explanation will be omitted. The configuration of the right-side sub-storage unit 50R can be explained by simply substituting "R#" for "L#" in the explanation provided above.

Figure 7:
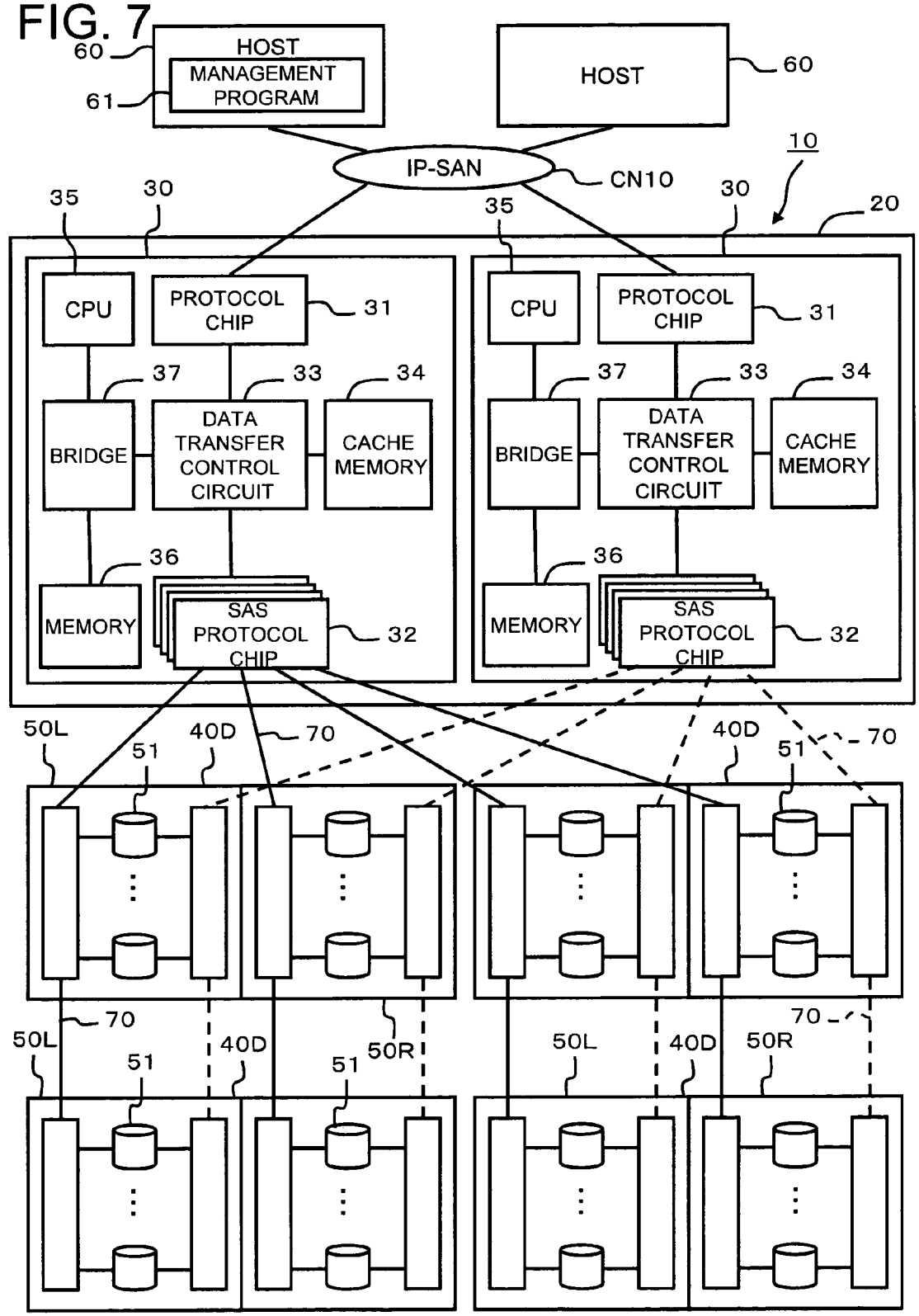
FIG. 7 is a block diagram showing the configuration of a system comprising the storage controller.

FIG. 7 is an illustration showing the overall configuration of an information processing system comprising the storage controller 10. A host 60, for example, is a computer device such as a server computer, mainframe computer, workstation, or personal computer.

The storage controller 10 can be connected to a plurality of hosts 60 by way of a communication network CN10. A management program 61 for managing the storage controller 10 can be disposed in any one or more hosts 60 of the plurality of hosts 60. As will be explained further below, the user uses this management program 61 to either issue an indication to the storage controller 10 or to receive a report from the storage controller 10. The communication network CN10 is configured like a FC-SAN (Fibre Channel-Storage Area Network) or a IP-SAN (Internet Protocol-SAN).

The control unit 20 comprises a plurality of controllers 30. The respective controllers 30 comprise the same configuration, and each operates independently. The respective controllers 30 are connected to the respective storage units 40 via respectively different paths. Therefore, even when the one controller 30 malfunctions and stops, it is possible to access and read/write data from/to a desired hard disk drive 51 from the other controller 30.

Each controller 30, for example, comprises a protocol chip 31, SAS protocol chip 32, data transfer control circuit 33, cache memory 34, CPU (Central Processing Unit) 35, memory 36, and bridge 37.

The protocol chip 31 is a communication control circuit for communicating with the host 60. The SAS protocol chip 32 is a communication control circuit for communicating with the normal storage unit 40N and sub-storage unit 50 (in the case of a high-density storage unit 40D). A plurality of SAS protocol chips 32 can be provided. In this embodiment, a case which provides four SAS protocol chips 32 will be explained.

The data transfer control circuit 33 is a circuit for controlling the transfer of data. The data transfer control circuit 33 is connected to the protocol chip 31, the SAS protocol chip 32, the cache memory 34, the CPU 35, and the memory 36.

The data transfer control circuit 33, for example, transfers data received from the host 60 via the protocol chip 31 to the cache memory 34, and transfers data stored in the cache memory 34 to the SAS protocol chip 32. Furthermore, the data transfer control circuit 33 transfers data received from a hard disk drive 51 via the SAS protocol chip 32 to the cache memory 34, and transfers data stored in the cache memory 34 to the protocol chip 31.

The CPU 35 is for controlling the operation of the controller 30. The memory 36 stores a computer program and management data. The CPU 35 and memory 36 are connected to the data transfer control circuit 33 by way of the bridge 37.

Figure 8:
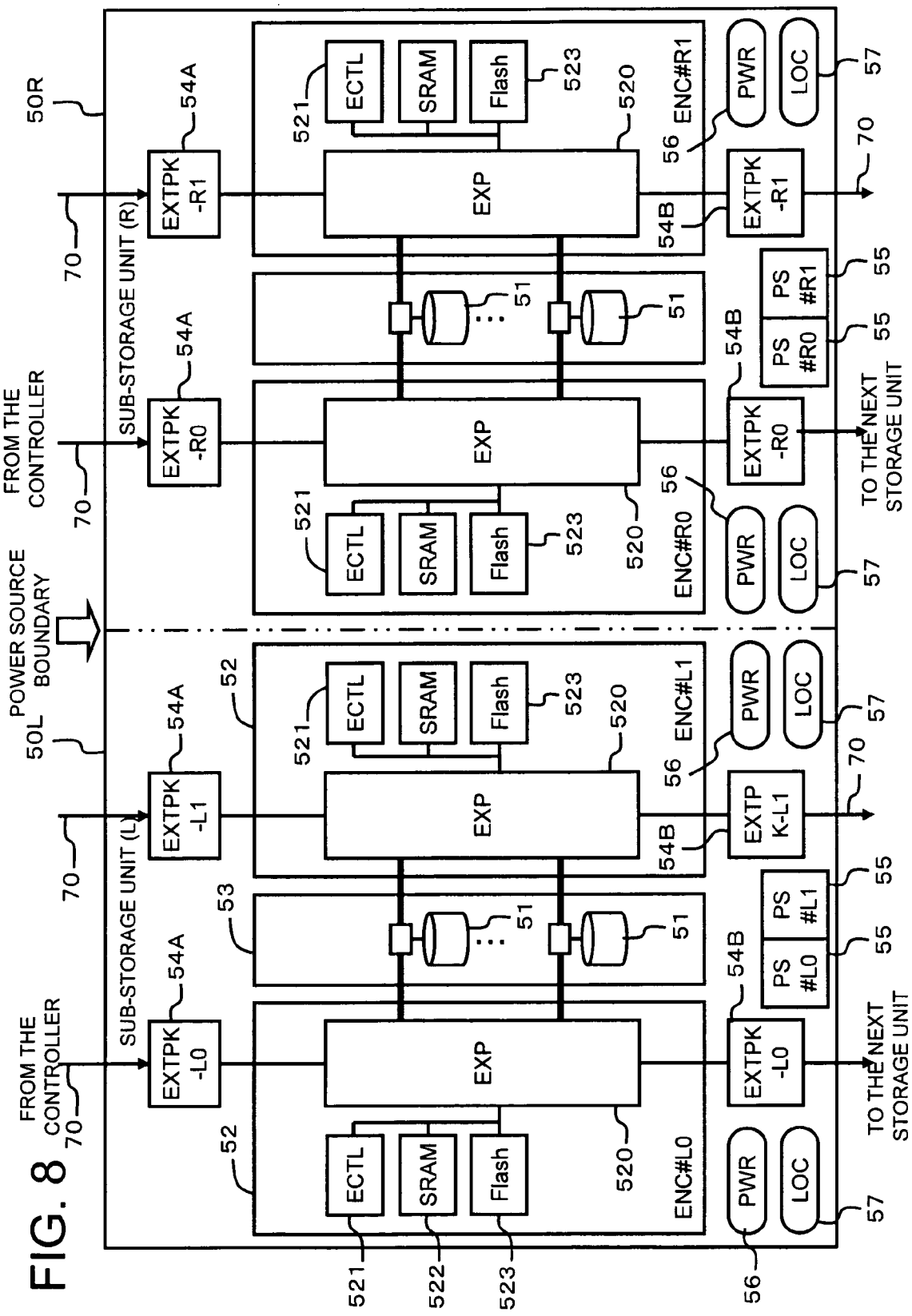
FIG. 8 is a block diagram of a storage unit.

FIG. 8 is a block diagram showing the configuration of the high-density storage unit 40D. As explained hereinabove, the high-density storage unit 40D comprises a plurality of sub-storage units 50L, 50R. The sub-storage units 50L, 50R comprise the same configuration, and can operate independently of one another.

The left-side sub-storage unit 50L will be explained. The sub-storage unit 50L, for example, comprises 24 hard disk drives 51, two enclosures 52, one backboard 53, two input signal cable holders 54A and two output signal cable holders 54B, two power supply devices 55, one power source lamp 56, and one location display lamp 57.

The enclosure 52 controls communications with the respective hard disk drives 51. The enclosure 52, for example, comprises an expander 520, environment controller 521, memory 522 and flash memory 523. The one enclosure 52 (#L0) and the other enclosure 52 (#L1) can both access the hard disk drive 51.

The expander 520 is a circuit for respectively connecting the 24 hard disk drives 51. The input signal cable holder 54A and the output signal cable holder 54B are connected to the expander 520. Then, the respective hard disk drives 51 are connected to the expanders 520 of the respective enclosures 52 by way of the backboard 53. A command issued from the controller 30 is transmitted via the cable 70 or the like to the enclosure 52 to which the desired hard disk drive 51 is connected and processed.

The environment controller 521, which is denoted as "ECTL" in the drawing, is a controller for managing the environment. The memory 522, which is denoted as "SRAM" in the drawing, is a memory for temporarily storing data. The flash memory 523, which is denoted as "Flash" in the drawing, is a memory for pre-storing a manufacturer number D10, sub-storage unit type D20 and SAS address D30, which will be explained further below.

The power supply devices 55 respectively supply power to the enclosures 52 and lamps 56, 57. Even when either one of the power supply devices 55 shuts down due to a failure, it is possible to supply power from the other power supply device 55.

The power source lamp 56 and the location display lamp 57 are disposed on the front side 43 of the high-density storage unit 40D (refer to FIG. 3) corresponding to the respective sub-storage units 50L, 50R. The power source lamp 56 denotes the power supply status to the sub-storage unit 50. When power is being supplied, the power source lamp 56 lights up. The location display lamp 57 is a lamp for informing the user of the location of the sub-storage unit 50. When the user uses the host 60 management program 61 to specify either of the sub-storage units 50, the location display lamp 57 corresponding to this specified sub-storage unit 50 lights up.

The right-side sub-storage unit 50R is configured the same as the left-side sub-storage unit 50L, and as such, an explanation thereof will be omitted. Furthermore, since a normal storage unit 40N does not comprise a sub-storage unit 50, one each of the power source lamp 56 and location display lamp 57 are provided. Further, fewer hard disk drives 51, such as 15 or 24, for example, can be mounted in the normal storage unit 40N than the number of drives (48) mounted in the high-density storage unit 40D.

Figure 9:
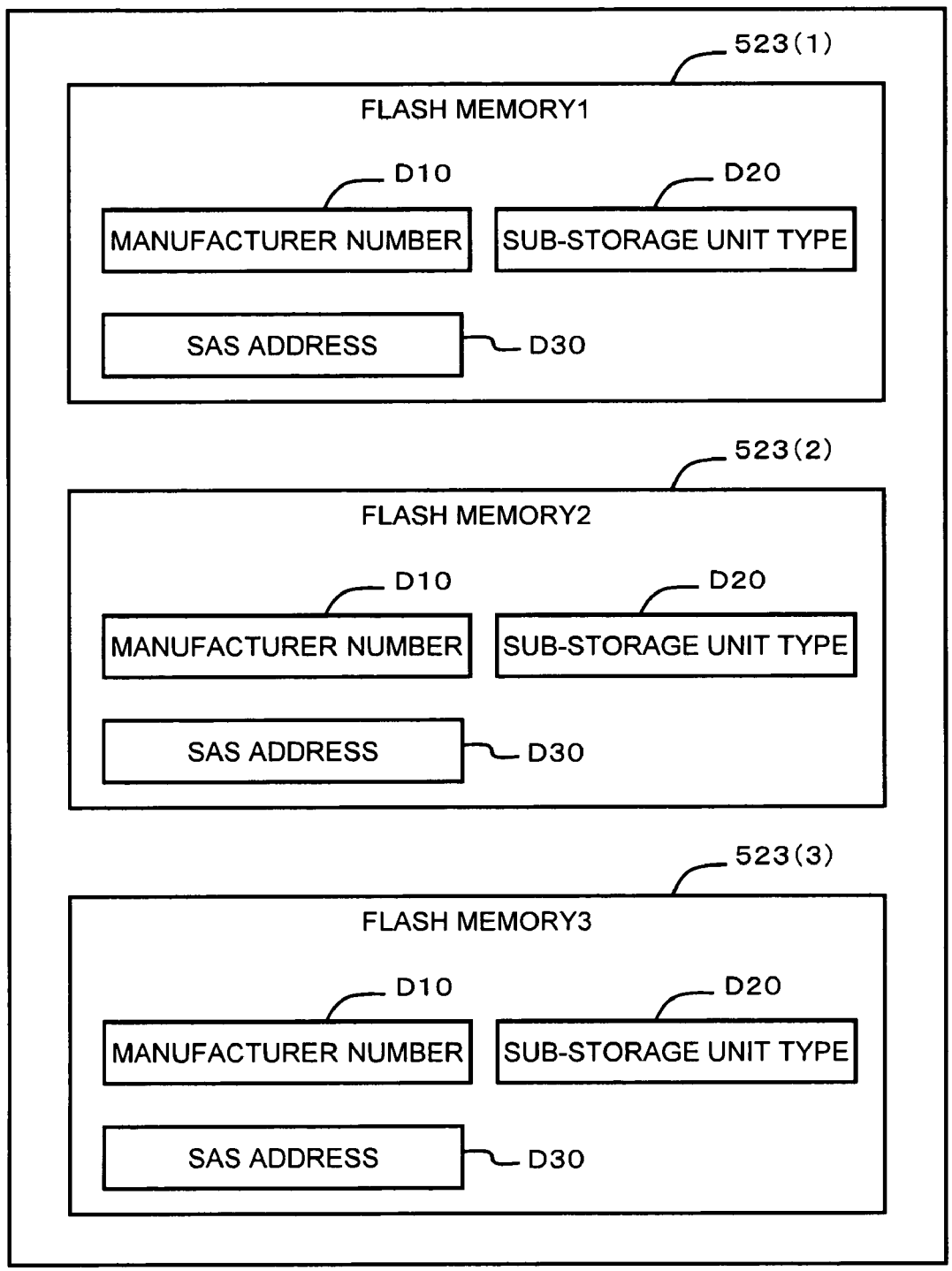
FIG. 9 is an illustration showing how the same management data is stored inside a plurality of flash memories.

FIG. 9 is an illustration schematically showing the storage structure of the flash memory 523. A plurality of (for example, three) flash memories 523 are disposed inside the sub-storage unit 50, and the same management data D10 through D30 is respectively stored in each of these flash memories 523.

As will be explained further below, the management data D10 through D30 is stored in three locations so that even if the management data cannot be read out from any one of the flash memories 523, it will still be possible to read the management data D10 through D30 from the remaining flash memories 523. Furthermore, a normal storage unit 40N does not always need to have a manufacturer number provided that it is possible to reliably read the SAS. Therefore, in a normal storage unit 40N, only the SAS address needs to be stored in a plurality of storage areas.

The manufacturer number D10 is identification information for specifying the respective storage units 40. The sub-storage unit type D20 is information for classifying the location of the sub-storage unit 50 as either the left side (L) or the right side (R). The SAS address D30 is address information for the controller 30 to access the sub-storage unit 50.

Figure 10:
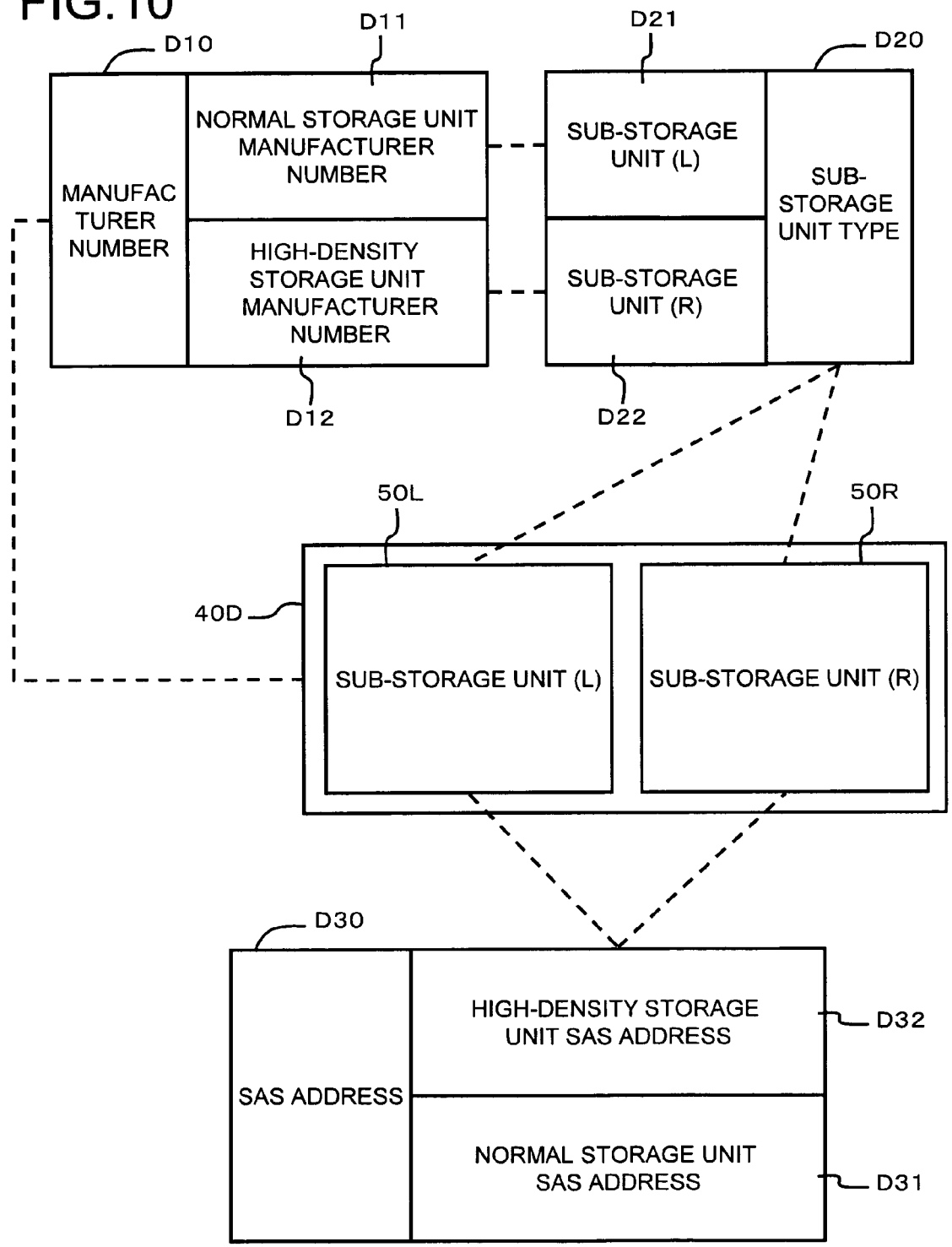
FIG. 10 is an illustration showing the relationship between management data and either a sub-storage unit or a storage unit.

FIG. 10 is an illustration showing the relationship between the respective management data D10 through D30 and the storage unit 40D and sub-storage unit 50. As explained above, the manufacturer number D10 is a number that is unique to each storage unit 40, and one is configured for each of the storage units 40 regardless of whether it is a normal storage unit 40N or a high-density storage unit 40D.

However, the manufacturer number D10 is selected from within a preset range in accordance with the type of storage unit 40. For a normal storage unit 40N, one manufacturer number, which is selected from among a group of manufacturer numbers D11 prepared for normal storage units, is configured. For a high-density storage unit 40D, one manufacturer number, which is selected from among a group of manufacturer numbers D12 prepared for high-density storage units, is configured.

Either one of data D21, which denotes a sub-storage unit 50L that is arranged on the left side as viewed from the front, or data D22, which denotes a sub-storage unit 50R that is arranged on the right side as viewed from the front, is configured in the sub-storage unit type D20. The sub-storage unit type D20 can be configured to correspond with the manufacturer number D10. For example, the manufacturer number D10 and sub-storage unit type D20 can be made correspondent by making the configuration such that a one-bit sub-storage unit type D20 is appended at the end of the manufacturer number D10 and the manufacturer number D10 and sub-storage unit type D20 are read out at the same time.

The SAS address D30 is configured from within a range that is prepared in advance in accordance with the type of storage unit 40. For a normal storage unit 40N, one SAS address D30, which is selected from among a group of SAS addresses D31 prepared for normal storage units, is configured. For a high-density storage unit 40D, one SAS address, which is selected from among a group of SAS addresses D32 prepared for high-density storage units, is configured.

FIG. 11 is an illustration showing a storage unit management table T10 for managing a storage unit 40. This management table T10, for example, can be stored inside the memory 36 of the controller 30.

The management table T10, for example, comprises a unit number column C10, a SAS address column C11, a manufacturer number column C12, a pair number column C13, a sub-storage unit type column C14, and a validation flag column C15.

The unit number column C10 stores a serial number for differentiating between the respective storage units in the table T10. The SAS address column C11 stores the SAS address D30 that has been configured for the storage unit 40. The manufacturer number column C12 stores the manufacturer number D10 that has been configured for the storage unit 40.

The pair number column C13 stores a pair number for differentiating between detected pairs. Pair signifies a pair of sub-storage units 50L, 50R belonging to the same storage unit 40D. The controller 30 of the control unit 20 acquires the manufacturer numbers D10 from the respective storage units (including the sub-storage units 50), and determines and manages as pairs units for which the same manufacturer number has been configured.

As explained above, the same manufacturer number is respectively configured in the sub-storage units 50L, 50R. Therefore, a plurality of units that responds to the controller 30 with the same manufacturer number can be judged to be a pair of sub-storage units 50L, 50R that are disposed in the same high-density storage unit 40D. The controller 30 configures consecutive pair numbers for pairs of sub-storage units 50L, 50R in the order in which these pairs are discovered.

The validation flag column C15 stores a value showing whether or not the contents registered in the management table T10 correctly reflect the prescribed rules. Examples of the prescribed rules will be described below using FIG. 17. When the contents of a row are correct, data (for example, OK) denoting that these contents are valid is stored. When the contents of a row violate a rule, data (for example, NG) denoting that these contents are not valid is stored.

Figure 12:
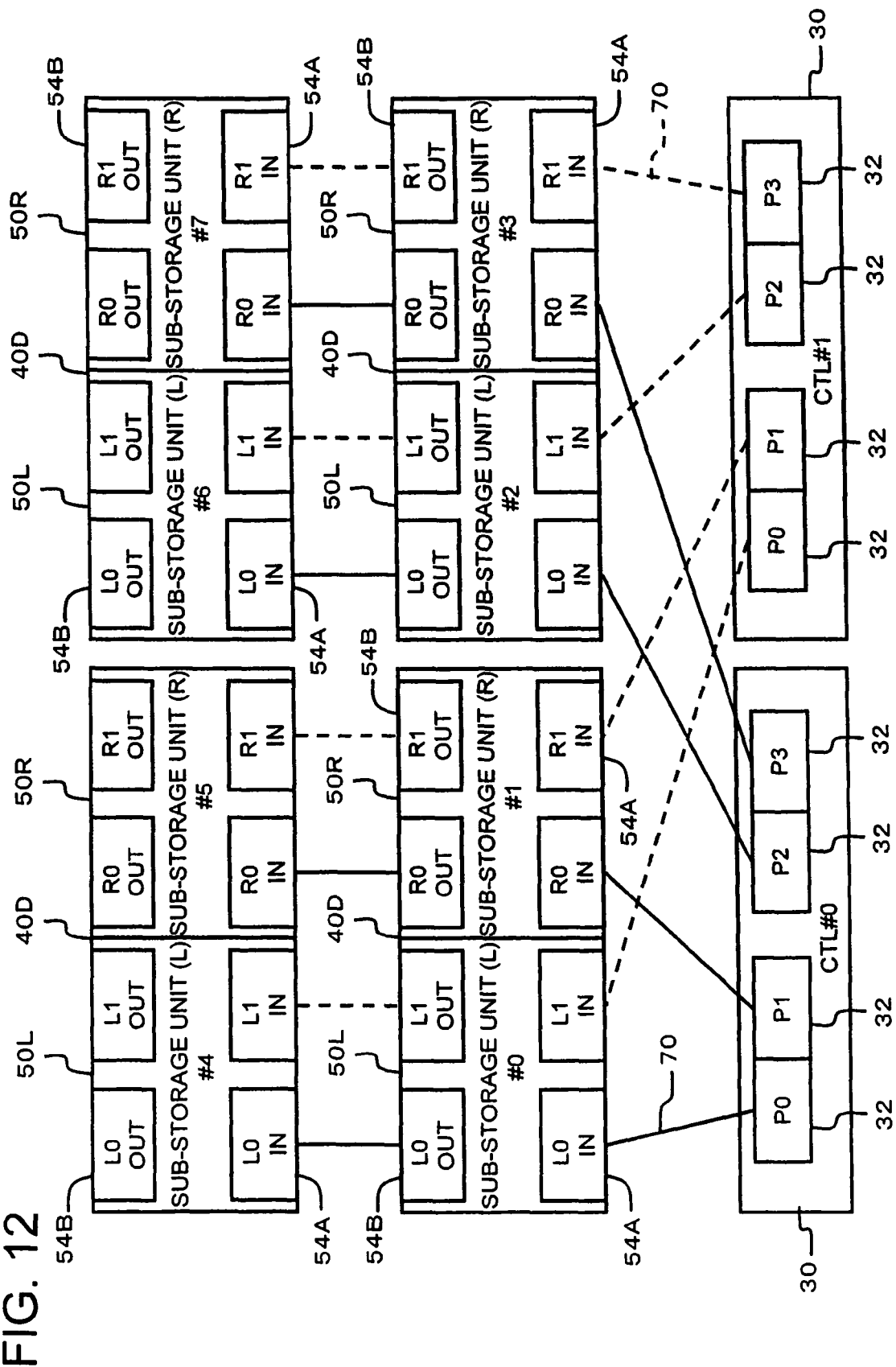
FIG. 12 is an illustration showing the connection configuration of storage units.

FIG. 12 is an illustration showing the connection configuration of the high-density storage unit 40D. The controllers 30 in this embodiment respectively comprise four SAS protocol chips 32. In FIG. 12, the respective SAS protocol chips 32 are differentiated by assigning reference numerals P0 through P3 to the communication ports.

As shown in FIG. 12, the respective sub-storage units 50 of the high-density storage unit 40D are connected in a daisy chain, and the sub-storage units 50 each have two access paths. The one access path is the 0 series path (#0 series) and the other one access path is the 1 series path (#1). The 0 series path is accessed by the one controller 30 (#0), and the 1 series path is accessed by the other controller 30 (#1).

The sub-storage units 50 are connected to the respective SAS protocol chips 32 such that the load on the SAS protocol chips 32 is uniform, that is, so that the total of four communication paths are used substantially uniformly.

The unit numbers (#0 through #7) of the respective sub-storage units 50 are decided in the order in which the sub-storage units 50 are connected to the controllers 30. The respective sub-storage units 50 are frequently used in ascending unit number order. Therefore, the sub-storage units 50 are connected, to the controllers 30 in accordance with the order P0 through P3 such that the respective SAS protocol chips 32 are used substantially uniformly.

Specifically, first sub-storage unit 50 (#0) is connected to communication port P0, then sub-storage unit 50 (#1) is connected to communication port P1, then sub-storage unit 50 (#2) is connected to communication port P2, and finally sub-storage unit 50 (#3) is connected to communication port P3. This results in one sub-storage unit 50 being connected to one communication port (communication path). Thereafter, the sub-storage units 50 are connected in order to the communication ports in the same way. Consequently, it is possible to distribute the load by making the utilization frequency of the respective communication ports substantially uniform.

FIG. 13 is an illustration showing how normal storage units 40N and high-density storage units 40D are intermixedly used. The high-density storage unit 40D has been explained for the most part, but in this embodiment, it is possible to use both the high-density storage unit 40D and normal storage unit 40N at the same time. Without showing the load distribution, FIG. 13 schematically depicts how different types of storage units 40D, 40N are intermixed.

As shown in FIG. 13, for example, a normal storage unit 40N (#2) is disposed adjacent to a high-density storage unit 40D having sub-storage unit 50L (#0) and sub-storage unit 50R (#1). A high-density storage unit 40D having sub-storage unit 50L (#3) and sub-storage unit 50R (#4) is disposed adjacent to this normal storage unit 40N (#2). In addition, a high-density storage unit 40D having sub-storage unit 50L (#5) and sub-storage unit 50R (#6) is disposed adjacent thereto.

Figure 14:
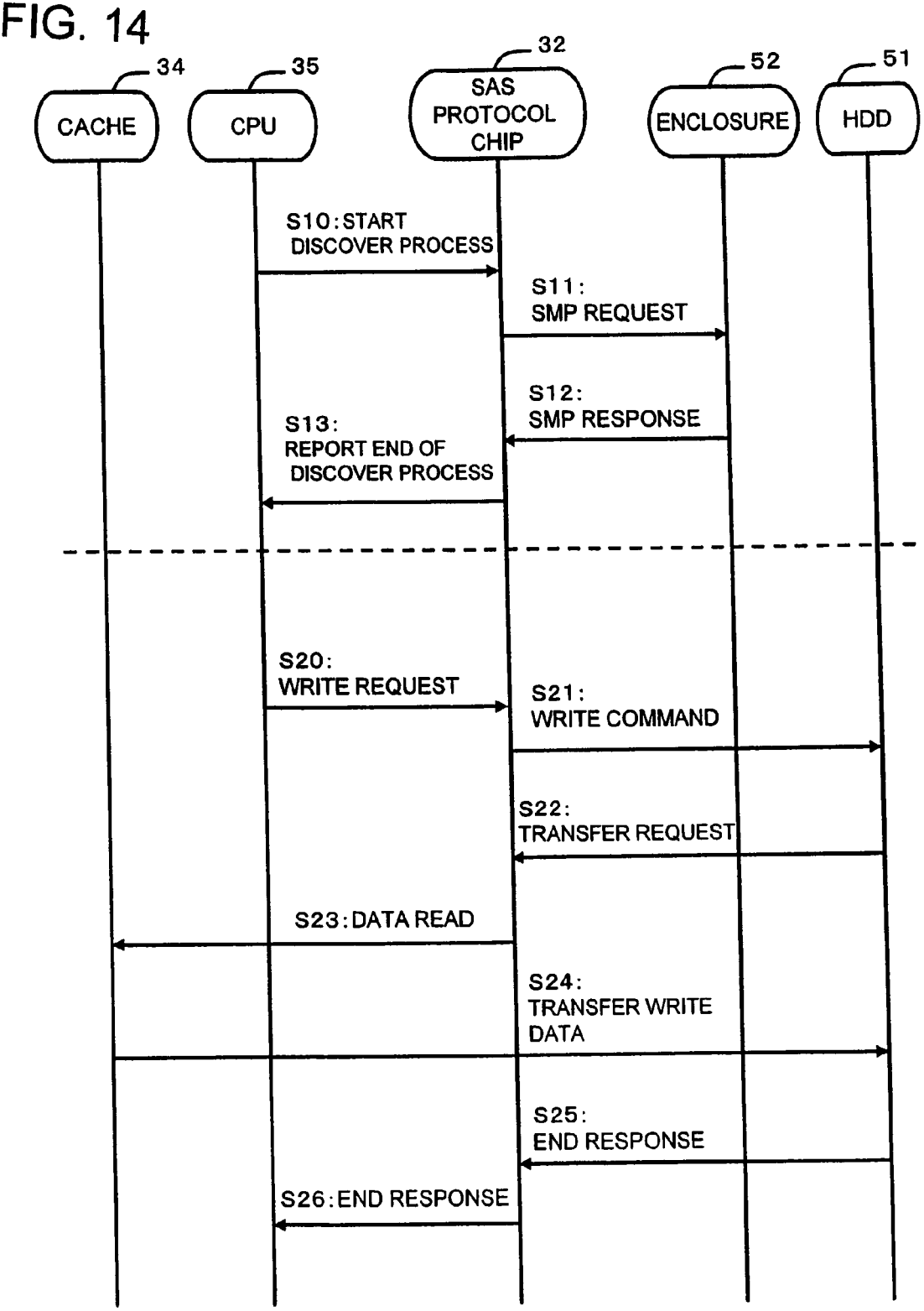
FIG. 14 is a flowchart showing the process for writing data from the controller to a hard disk drive.

FIG. 14 is a flowchart showing a write process. Prior to executing a write process, the CPU 35 starts up the discover process (S10). The discover process detects the respective storage units 40 (including the sub-storage units 50) that are connected to the controllers 30, and registers same in the management table T10. This process will be described in detail further below using FIG. 16.

The discover process will be explained simply here. The SAS protocol chip 32 issues a SMP (Simple Message Protocol) request to the enclosure 52 in response to an indication from the CPU 35 (S11). The enclosure 52 responds to this SMP request (S12). The SAS protocol chip 32, upon receiving the SMP responses from the respective connected enclosures 52 and confirming the existence of the storage units 40N and sub-storage units 50, reports to the CPU 35 to the effect that the discover process has been completed (S13). The CPU 35 registers the detected storage units 40N and sub-storage units 50 in the management table T10 in the order they were detected.

Next, write command processing will be explained. Upon receiving a write command from the host 60, the CPU 35 of the controller 30 makes preparations to receive the write data. Then, the CPU 35 stores the write data received from the host 60 in the cache memory 34.

At a prescribed timing, the CPU 35 commences a destage process. The destage process writes the write data stored in the cache memory 34 to the hard disk drive 51. In the case of a synchronous system, after completing the destage process, the CPU 35 notifies the host 60 to the effect that write command processing has ended. In the case of an asynchronous system, the CPU 35 stores the write data from the host 60 in the cache memory 34, and thereafter notifies the host 60 to the effect that write command processing has ended.

When the destage process is commenced, the CPU 35 issues a write request to the SAS protocol chip 32 (S20). The SAS protocol chip 32 that receives the request from the CPU 35 issues a write command to a prescribed hard disk drive 51 (S21). This write command is transmitted to the prescribed hard disk drive 51 by way of the expander 520 and so forth. The prescribed hard disk drive 51 is the hard disk drive having the storage area into which to write the write data.

The hard disk drive 51 that receives the write command from the CPU 35 requests the SAS protocol chip 32 to transfer the write data (S22). The SAS protocol chip 32 reads out the write data from the cache memory 34 (S23), and transfers this write data to the hard disk drive 51 (S24).

The hard disk drive 51 writes the write data received from the SAS protocol chip 32 to a magnetic disk, and reports to the SAS protocol chip 32 to the effect that the write has ended (S25). The SAS protocol chip 32 that receives this report reports to the CPU 35 to the effect that the write to the hard disk drive 51 has ended (S26). The destage process (write processing to the hard disk drive) is completed in accordance with the above-mentioned S20 through S26.

Figure 15:
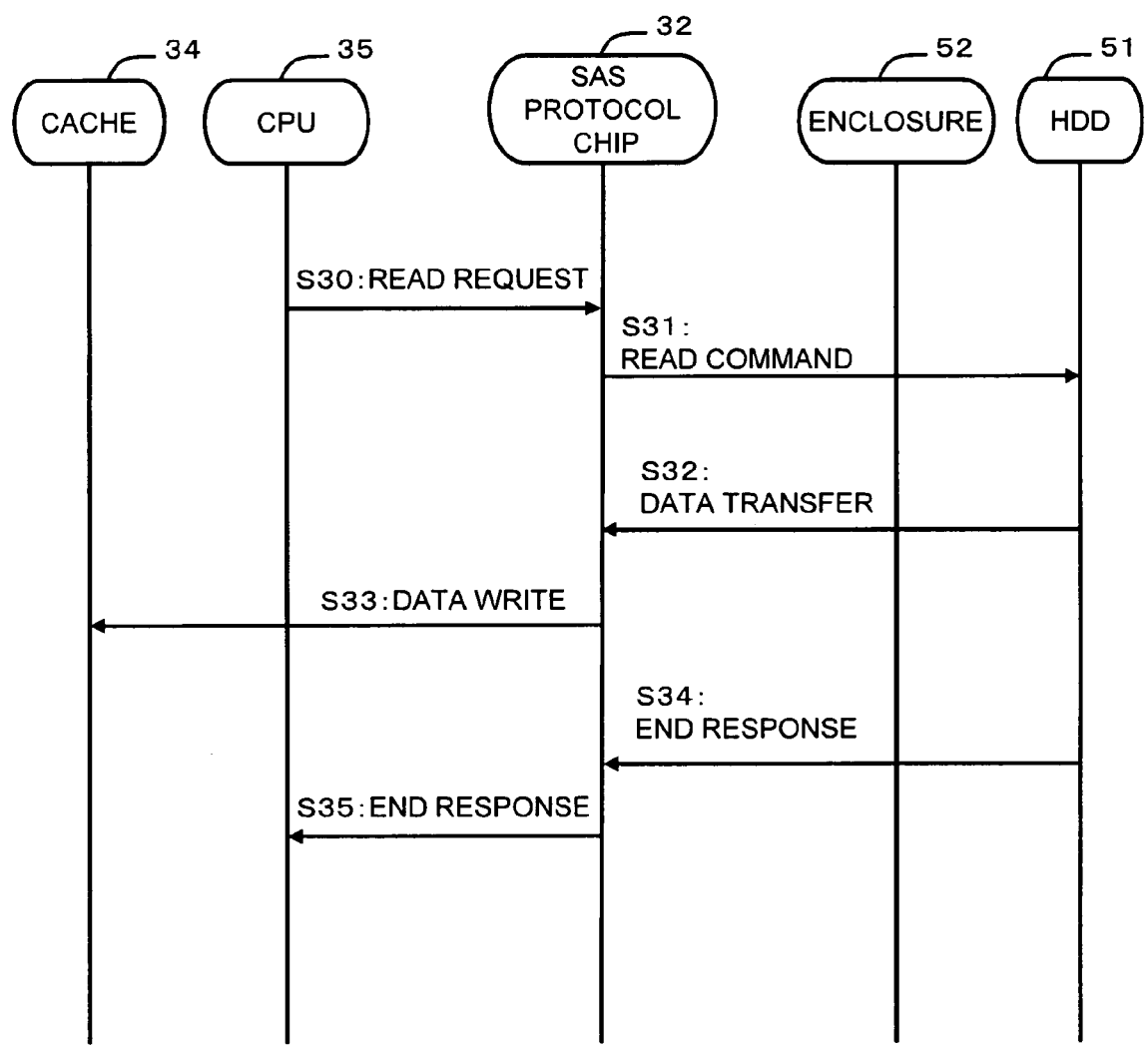
FIG. 15 is a flowchart showing the process by which the controller reads data from a hard disk drive.

FIG. 15 is a flowchart showing a read process. The host 60 issues a read command to the controller 30. The read command comprises the logical address of the read destination and a data size.

The CPU 35 that receives the read command requests the SAS protocol chip 32 for a data read (S30). The SAS protocol chip 32 issues a read command to the hard disk drive 51 that is storing the data to be read out (S31). The read command is sent to the hard disk drive 51 by way of the expander 520 and so forth.

The hard disk drive 51 that receives the read command transfers the requested data to the SAS protocol chip 32 (S32) The SAS protocol chip 32 transfers the data received from the hard disk drive 51 and stores this data in the cache memory 34 (S33). Then, the SAS protocol chip 32, upon receiving a report from the hard disk drive 51 to the effect that read command processing has been completed, reports to the CPU 35 to the effect that the data read has ended (S35).

Figure 16:
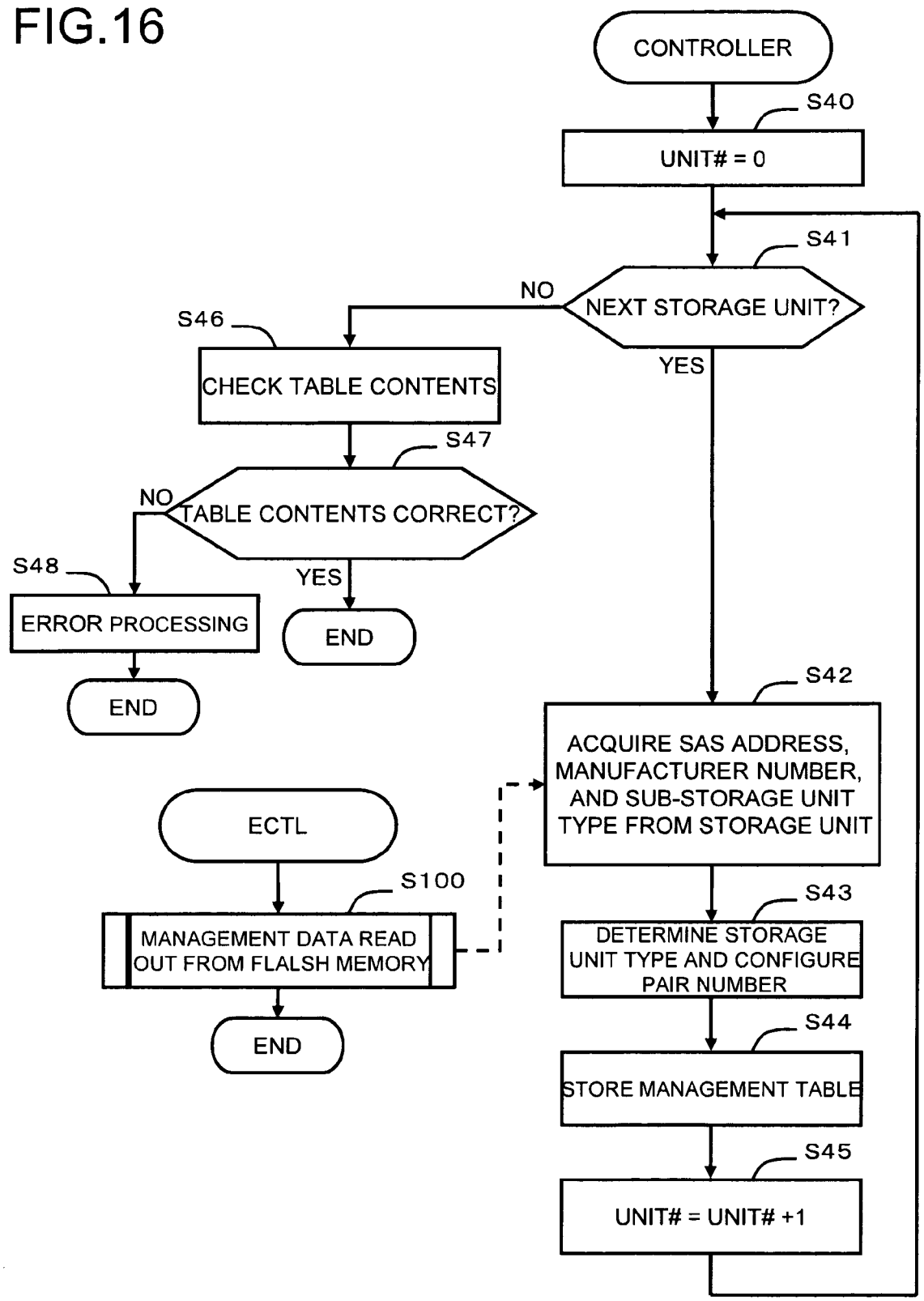
FIG. 16 is a flowchart of the table creation process executed when the storage controller starts up.

FIG. 16 is a flowchart showing the process when the storage controller 10 is started up. In this process, the storage units (including the sub-storage units) of the storage controller 10 are examined, and the results of this check are stored in the management table T10. This process is executed by the CPU 35 inside the controller 30.

First of all, the CPU 35 sets "0" in the unit number (S40). Next, the CPU 35 determines whether or not the next storage unit exists (S41). Since the process is just getting started at this point, the determination made in S41 is YES (S41: YES).

The CPU 35 acquires the manufacturer number D10, sub-storage unit type D20 (if one exists), and the SAS address D30 from the storage unit (S42). When the CPU 35 has determined from the SAS address and so forth that the storage unit is a sub-storage unit, the CPU 35 acquires the sub-storage unit type D20 from this storage unit. The enclosure 52 inside the storage unit reads out the respective data D10 through D30 from the flash memory 523, and sends this data to the CPU 35 (S100). S100 will be described in detail further below using FIGS. 23 and 24.

Upon acquiring the same manufacturer number, the CPU 35 determines that the storage units (sub-storage units) having the same manufacturer number are a pair, and configures a pair number (S43). Similar to S42, when the CPU 35 determines from the SAS address and so forth that this storage unit is a sub-storage unit, the CPU 35 determines that there is a pair of sub-storage units. Then, the CPU 35 stores the acquired management data D10 through D30 and the pair number in the management table T10 (S44). The CPU 35 adds one to the unit number (S45) and returns to S41.

The CPU 35 creates a management table T10 by acquiring the respective management data D10 through D30 like this in order beginning with the storage unit closest to the controller 30. Then, after acquiring the management data D10 through D30 from the storage unit located at the end of the connection (S41: NO), the CPU 35 checks the contents of the management table T10 (S46).

The CPU 35 checks the contents stored in the management table T10 on the basis of preconfigured prescribed rules (S46), and determines whether or not these contents are correct (S47). When the contents of the management table T10 are correct, this means that the contents do not violate the prescribed rules. When all of the contents stored in the management table T10 are correct (S47: YES), this processing ends. By contrast, when even a portion of the contents stored in the management able T10 are in error (S47: NO), the CPU 35 executes error processing (S48). In error processing, for example, the user is notified to the effect that an error was made in the creation of the management table T10. This error notification, for example, can be carried out using electronic mail or the like.

Figure 17:
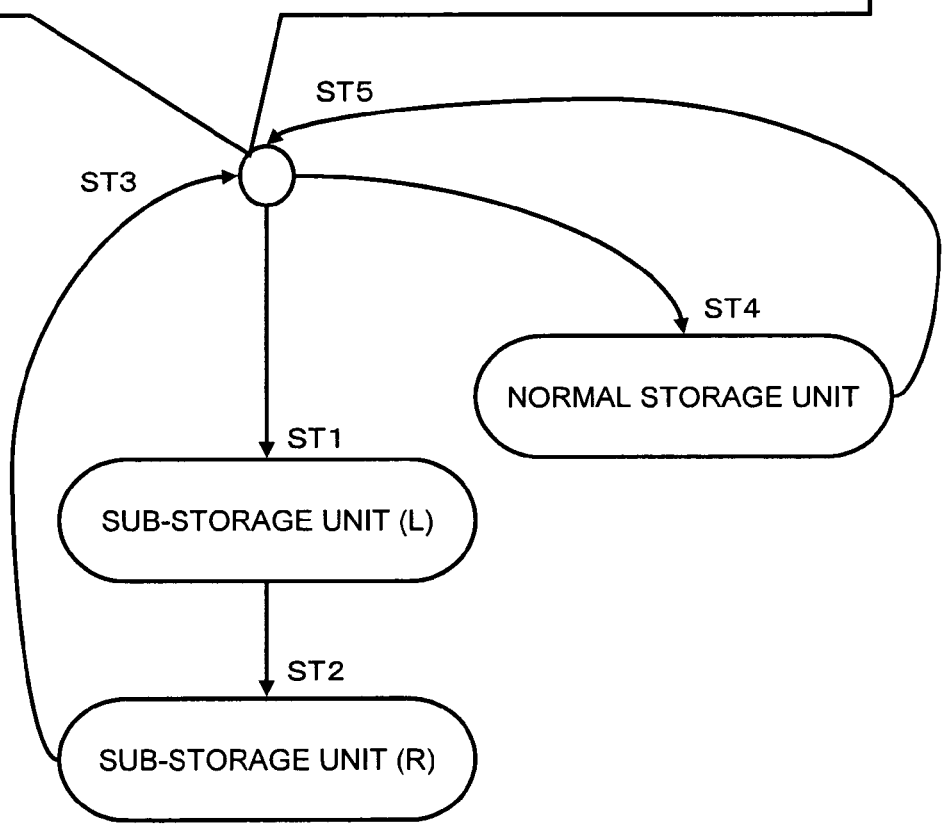
FIG. 17 is an illustration showing the rules used for determining the correctness of the contents of the management table.

FIG. 17 is an illustration showing the rules for determining whether or not the contents of the management table T10 are correct. In this embodiment, it is necessary that the respective sub-storage units 50L, 50R of a single high-density storage unit 40D have consecutive unit numbers, and, in addition, the left-side sub-storage unit 50L has a higher connection priority than the right-side sub-storage unit 50R. Therefore, when the unit initially connected to the controller 30 is a left-side sub-storage unit 50L (ST1), the unit that is connected subsequently must be a right-side sub-storage unit 50R (ST2), and an error determination is made if a unit other than a right-side sub-storage unit 50R is connected. Consequently, the unit number of the left-side sub-storage unit 50L will be one less than the unit number of the right-side sub-storage unit 50R.

After connecting the right-side sub-storage unit 50R, the CPU 35 returns to the determination criteria shown as a white circle in FIG. 17 (ST3). The determination criteria are concepts that are used for explaining the connection rules. When the subsequently connected unit is a normal storage unit 40N (ST4), the CPU 35 authorizes this connection and once again returns to the determination criteria.

Thus, the initial unit can be either a normal storage unit 40N or a high-density storage unit 40D, but in the case of a high-density storage unit 40D, the left-side sub-storage unit 50L must be connected first, and, in addition, the unit numbers of the respective sub-storage units 50L, 50R must be consecutive.

As shown in FIG. 17, the prescribed rules can be cited as first, in the case of a high-density storage unit 40D, that it be possible to acquire the manufacturer numbers D10 from each of the sub-storage units 50L, 50R (This will be explained further below using FIGS. 23 and 24); second, that the unit numbers be consecutive; third, that the unit numbers of the sub-storage units 50L, 50R inside the same high-density storage unit 40D be consecutive; and fourth, in a case in which a left-side sub-storage unit 50L is not the final storage unit, that a right-side sub-storage unit 50R be connected subsequent to a left-side sub-storage unit 50L (that a left-side sub-storage unit 50L be connected initially when connecting a high-density storage unit 40D).

Figure 18:
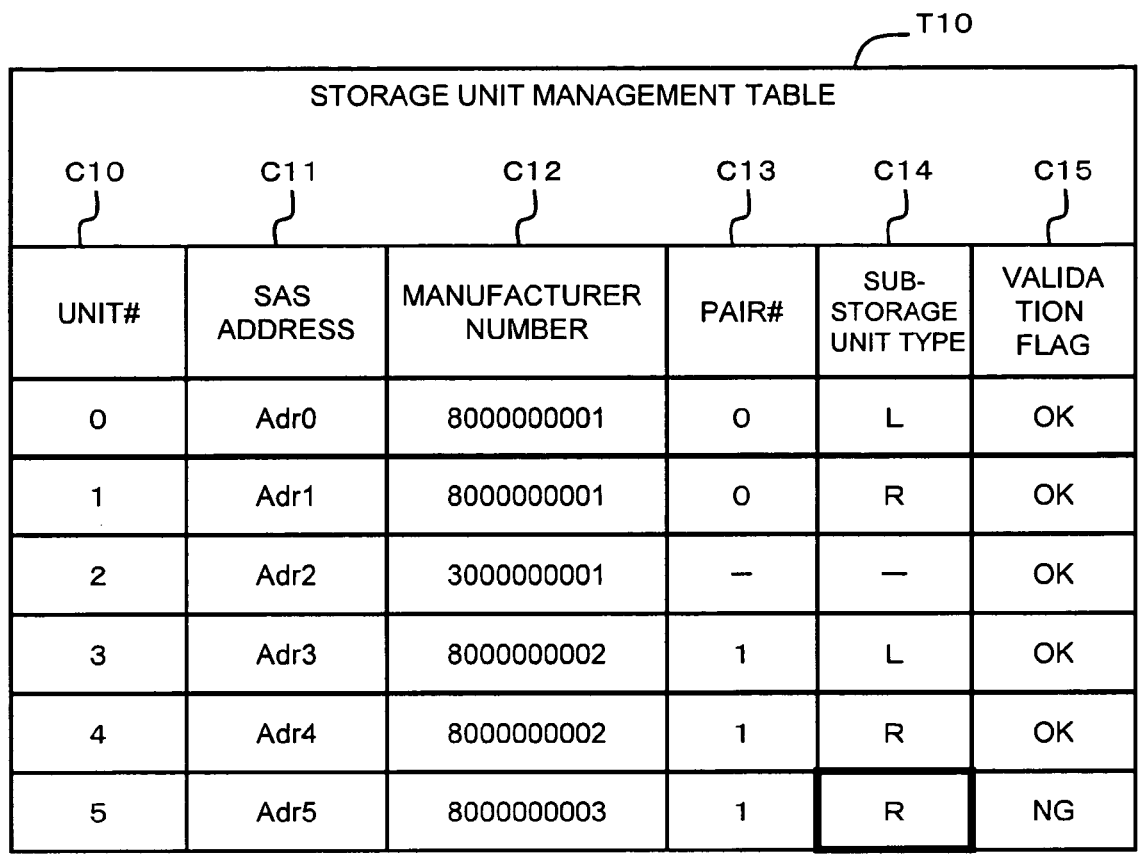
FIG. 18 is an illustration of a management table comprising erroneous contents.

FIG. 18 shows an example of a management table T10 comprising a portion that violates a rule. As shown in the last row of the management table T10, an "R" denoting a right-side sub-storage unit 50R is stored in the sub-storage unit type for unit number (#5). As explained above, when connecting the high-density storage unit 40D, the rule stating that a left-side sub-storage unit 50L must be connected first and that a right-side sub-storage unit 50R must not be connected first, has been configured. Therefore, the last row of the management table T10 shown in FIG. 18 constitutes an error, and "NG" is stored in the validation flag column. The user is notified of the detected error.

Figure 20:
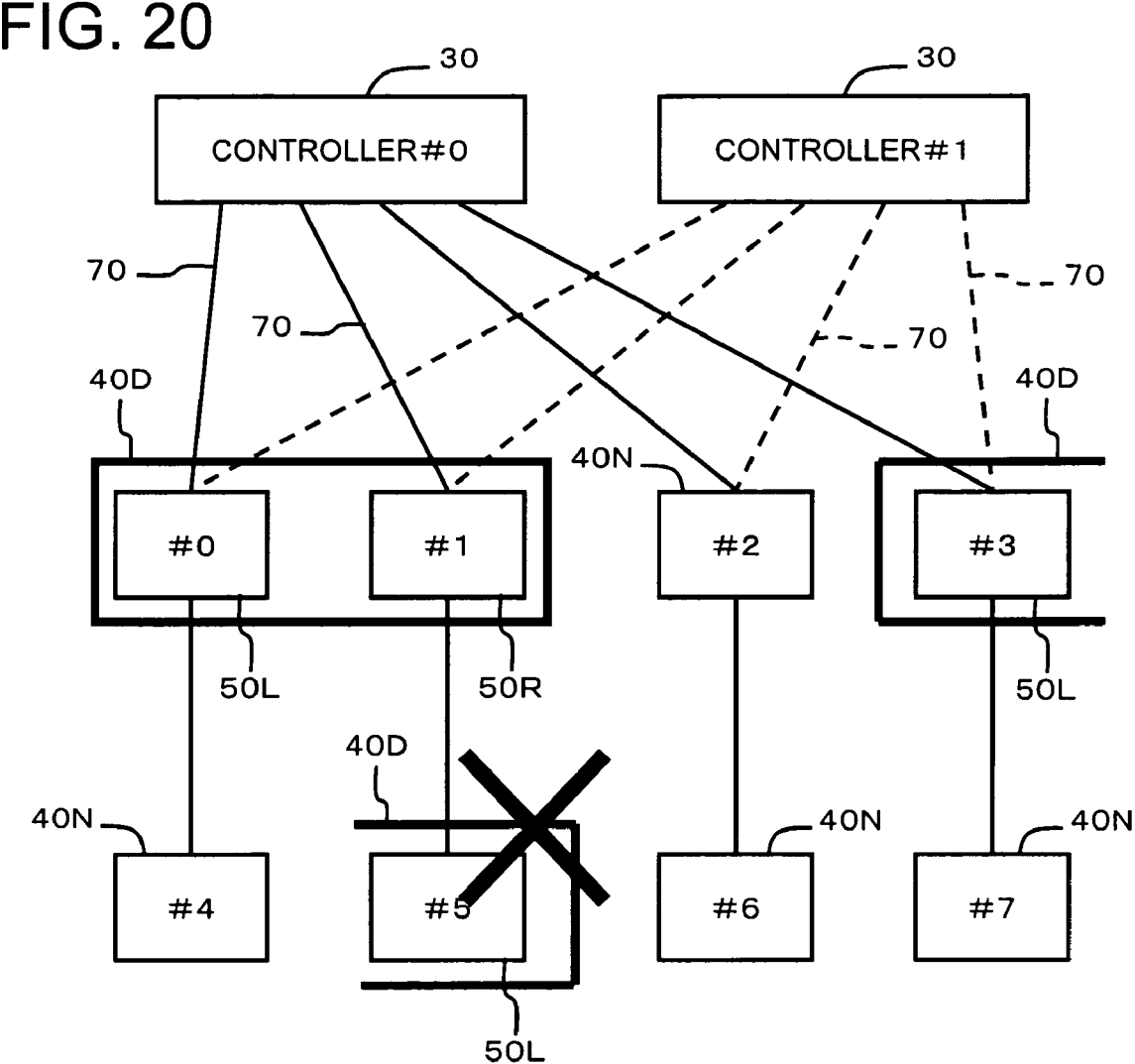
FIG. 20 is an illustration schematically showing the erroneous contents of FIG. 19.

FIG. 19 is an illustration showing the management table T10 comprising another error. FIG. 20 is an illustration schematically depicting the error state shown in FIG. 19. In the examples shown in FIGS. 19 and 20, the normal storage unit 40N shown in unit number (#4) has been wedged between the left-side sub-storage unit 50L shown in unit number (#3) and the right-side sub-storage unit 50R shown in unit number (#5). Therefore, an "NG" has been configured in the validation flags of both the unit number (#4) normal storage unit 40N and the unit number (#5) right-side sub-storage unit 50R.

When the respective sub-storage units inside the same case are not consecutively connected, the error depicted in FIG. 19 occurs. The trouble that occurs when this error is authorized will be explained. If the final sub-storage unit (#5) is removed from the storage controller for maintenance/replacement or to reduce the number of storage units installed, the other sub-storage unit (#3) inside the same case must also be removed from the storage controller.

The management numbers (the management number is managed in a set together with the case management data, differentiation data and address data) must be consecutive from the standpoint of managing the connection configuration of the respective storage units. When sub-storage unit (#3) and sub-storage unit (#5) are removed, the management number of storage unit (#2) and the management number of storage unit (#4) cease to be consecutive, giving rise to a management problem. Therefore, the respective sub-storage units inside the same case are connected so as to be consecutive in the daisy chain connection.

Figure 21:
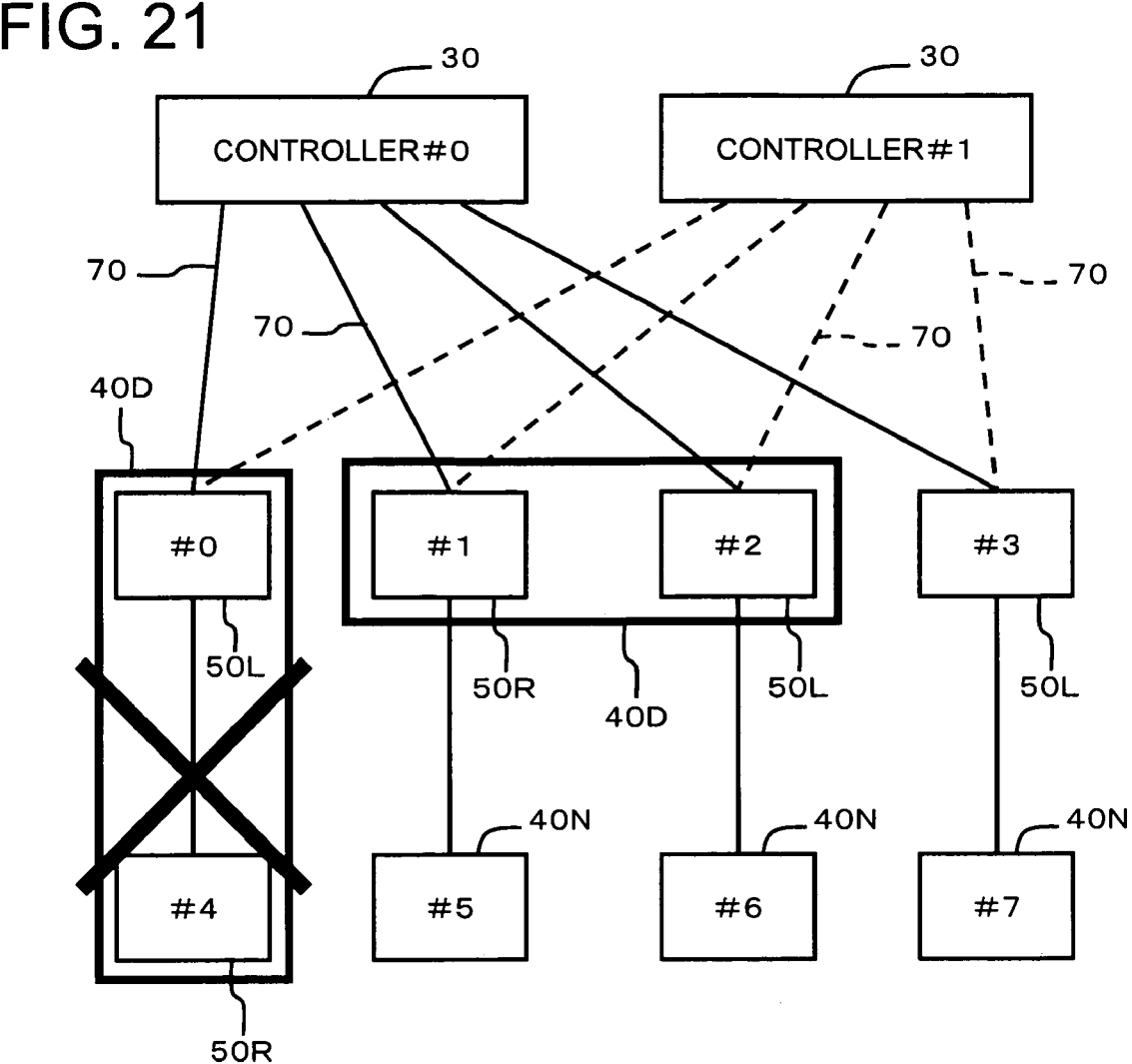
FIG. 21 is an illustration schematically showing a another connection error.

FIG. 21 is an illustration showing yet another error state. In this example, the unit numbers of the respective sub-storage units 50L, 50R belonging to the same high-density storage unit 40D are not consecutive, and the respective units of unit numbers #1, #2 and #3 exist between the left-side sub-storage unit 50L (unit number #0) and the right-side sub-storage unit 50R (unit number #4). The example shown in FIG. 21 also constitutes an error for the same reason as the example shown in FIGS. 19 and 20.

When another storage unit is wedged between the left-side sub-storage unit 50L and the right-side sub-storage unit 50R such that the unit numbers of the respective sub-storage units 50L, 50R belonging to the same high-density storage unit 40D are not consecutive, the continuity of the unit numbers is lost when the high-density storage unit 40D is removed for maintenance or the like. When the unit numbers are not consecutive, an error occurs, making it impossible to start up the storage controller 10 normally.

For example, in FIG. 20, since the unit number (#3) left-side sub-storage unit 50L and unit number (#5) right-side sub-storage unit 50R are disposed inside the same case 41, these sub-storage units 50L, 50R are removed from the storage controller 10 at the same time. This constitutes an error state because the unit numbers, that is, unit number (#4), unit number (#6) and unit number (#7), cease to be consecutive from #0.

In the example of FIG. 21, unit number continuity is lost when the high-density storage unit 40D comprising unit number #0 and unit number #4 is removed from the storage controller 10, and the respective units #1, #2, #3, #5, #6 and #7 constitute errors.

FIG. 22 shows a case in which manufacturer numbers could not be acquired from sub-storage units 50. As explained using FIG. 9, when the configuration is such that the manufacturer number D10, sub-storage unit type D20 and SAS address D30 are respectively stored inside a plurality of flash memories 523, it is possible to reduce situations in which the manufacturer number D10 alone cannot be read out. However, it is also conceivable that the manufacturer number could become impossible to read out due to a read error in the flash memory 523.

According to the SAS addresses, unit number #0 and unit number #1 belong to the high-density storage unit 40D. Since SAS addresses prepared in advance for high-density storage unit use are configured in the respective sub-storage units 50, a determination as to whether a storage unit is a high-density storage unit 40D or a normal storage unit 40N can be made using only the SAS addresses. However, the SAS address is configured for each sub-storage unit 50. Therefore, it is not possible to determine which sub-storage units constitute a pair using only the SAS address.

The manufacturer numbers must be acquired to detect a pair of sub-storage units. Therefore, when it is not possible to acquire the manufacturer number despite the sub-storage units 50 having been determined to belong to the high-density storage unit 40D, "NG" is configured in the validation flag. In the case of a normal storage unit 40N, there is no fault even when the manufacturer number cannot be acquired. This is because the normal storage unit 40N as a whole is one storage unit, and there is no need to use the manufacturer number to detect a pair.

Figure 23:
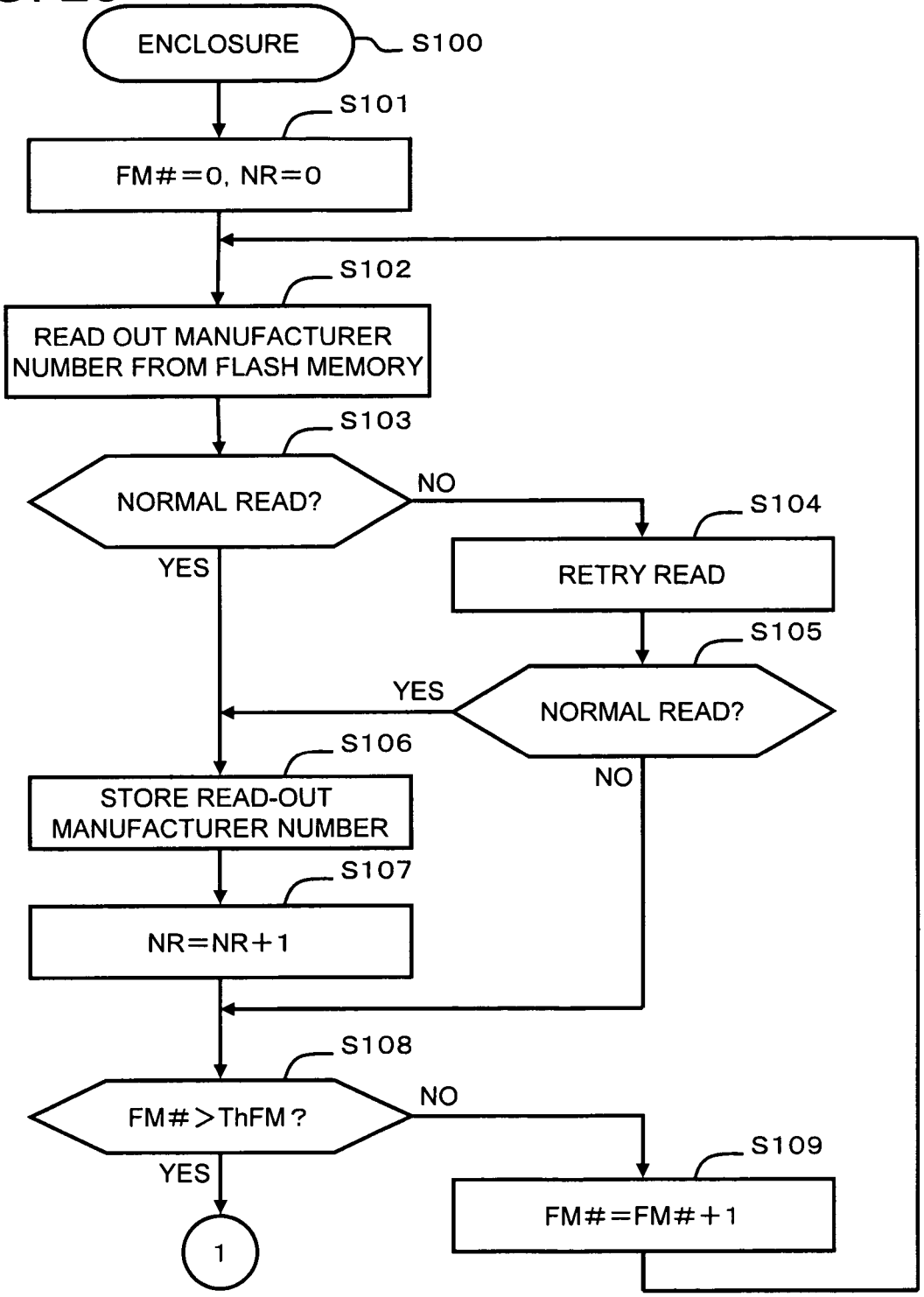
FIG. 23 is a flowchart showing the details of S100 in FIG. 16.
Figure 24:
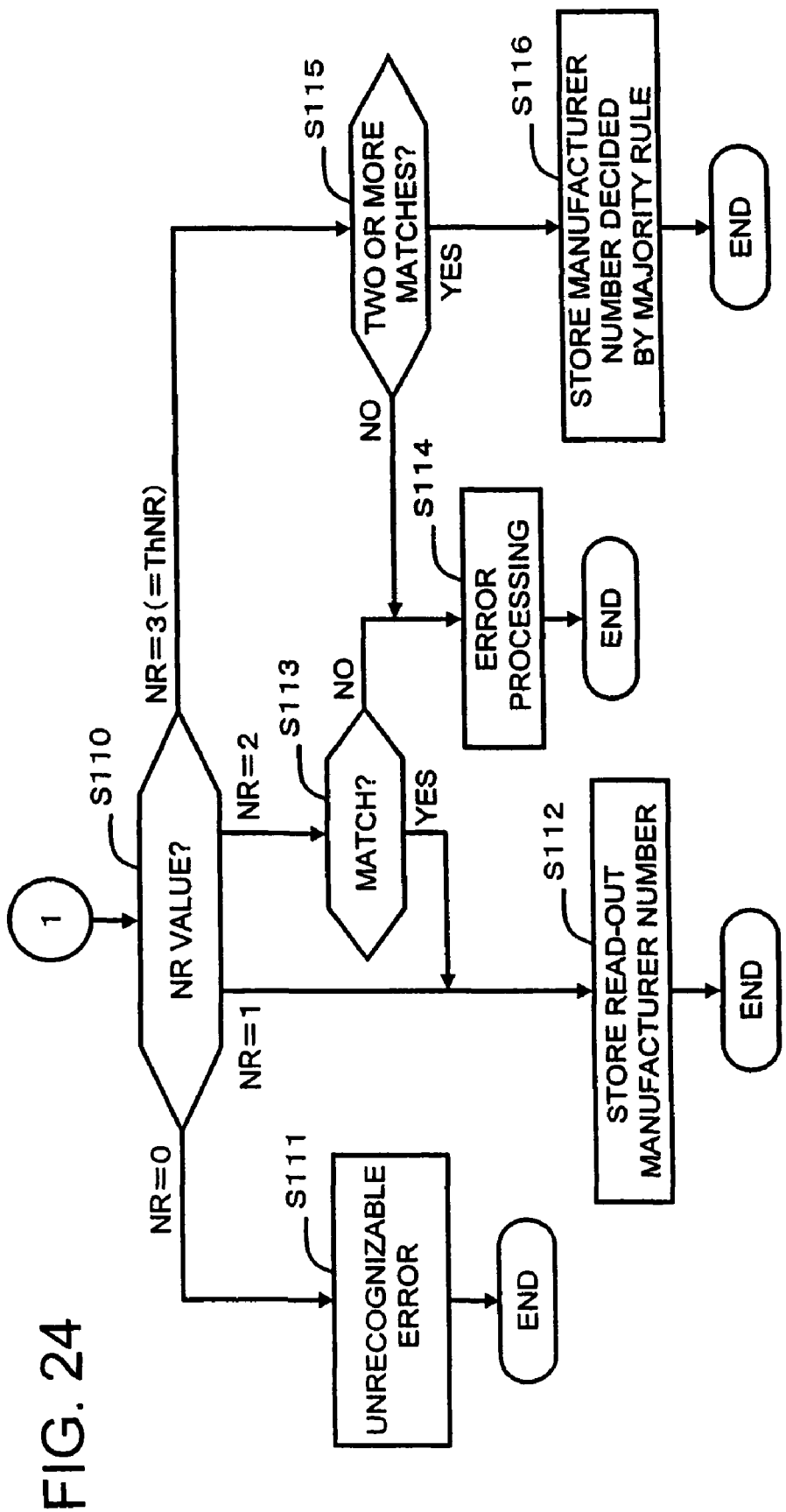
FIG. 24 is the continuation of the flowchart of FIG. 23.

FIGS. 23 and 24 are flowcharts showing the details of S100 in FIG. 16. In the processing shown in FIGS. 23 and 24, mainly a manufacturer number D10 read will be explained. The enclosure 52 executes the following steps at startup. The enclosure 52 respectively configures "0" in the variable FM and the variable NR (S101). FM is the flash memory number for specifying a flash memory 523. NR is the number of times it was possible to read out the manufacturer number.

The enclosure 52 reads out the manufacturer number from the initial flash memory 523 (FM=#0) (S102). The enclosure 52 determines whether or not it was possible to read out the manufacturer number normally (S103). When the manufacturer number read fails (S103: NO), the enclosure 52 attempts to read out the manufacturer number once again (S104), and once again determines whether or not it was possible to read out the manufacturer number normally (S105).

When the second manufacturer number read succeeds (S105: YES), or when the first manufacturer number read was successful (S103: YES), the enclosure 52 stores the read-out manufacturer number in the memory 522 (S106). The enclosure 52 increments the number of times read-out was successful NR by one (S107), and determines whether or not the flash memory number FM exceeds the maximum value ThFM (S108).

In this embodiment, the manufacturer number D10 is stored in each of the three flash memories 523. Therefore, the maximum value ThFM is "3". The enclosure 52 repeats steps S102 through S108 while switching the flash memory number FM (S109) until the manufacturer number has been read out from the three flash memories 523 (S108: NO).

As shown in FIG. 24, when the process for reading out the manufacturer number from the respective flash memories 523 has ended (S108: YES), the enclosure 52 determines the value of the number of times the read process was successful NR (S110).

When the manufacturer number could not be read out from any of the flash memories 523 (NR=0), the enclosure 52 determines that it is not possible to recognize the storage unit, and carries out error processing (S111).

When the manufacturer number could only be read out from one of the flash memories 523 (NR=1), the enclosure 52 stores the one manufacturer number that was read out in the memory 522 (S112).

When the manufacturer number could be read out from two of the flash memories 523 (NR=2), the enclosure 52 determines whether or not these two manufacturer numbers match (S113). When the two manufacturer numbers match (S113: YES), the enclosure 52 stores this matched manufacturer number in the memory 522 (S112). By contrast, when the two manufacturer numbers do not match (S113: NO), the enclosure 52 carries out error processing since it is difficult to determine which of the manufacturer numbers is correct (S114). In error processing, the user is notified via the host 60 or electronic mail to the effect that the manufacturer number could not be specified.

When the manufacturer number could be read out from all three flash memories 523 (NR=3), the enclosure 52 determines whether or not two or more of these three manufacturer numbers match (S115).

When two or more of the three manufacturer numbers are a match (S115: YES), the enclosure 52 stores this matched manufacturer number in the memory 522 (S116). When the three manufacturer numbers are all different (S115: NO), the enclosure 52 carries out error processing since it is not possible to determine which of the manufacturer numbers is correct (S114).

The enclosure 52 transfers the manufacturer number and so forth stored in the memory 522 to the CPU 35 in response to a request from the CPU 35.

Figure 25:
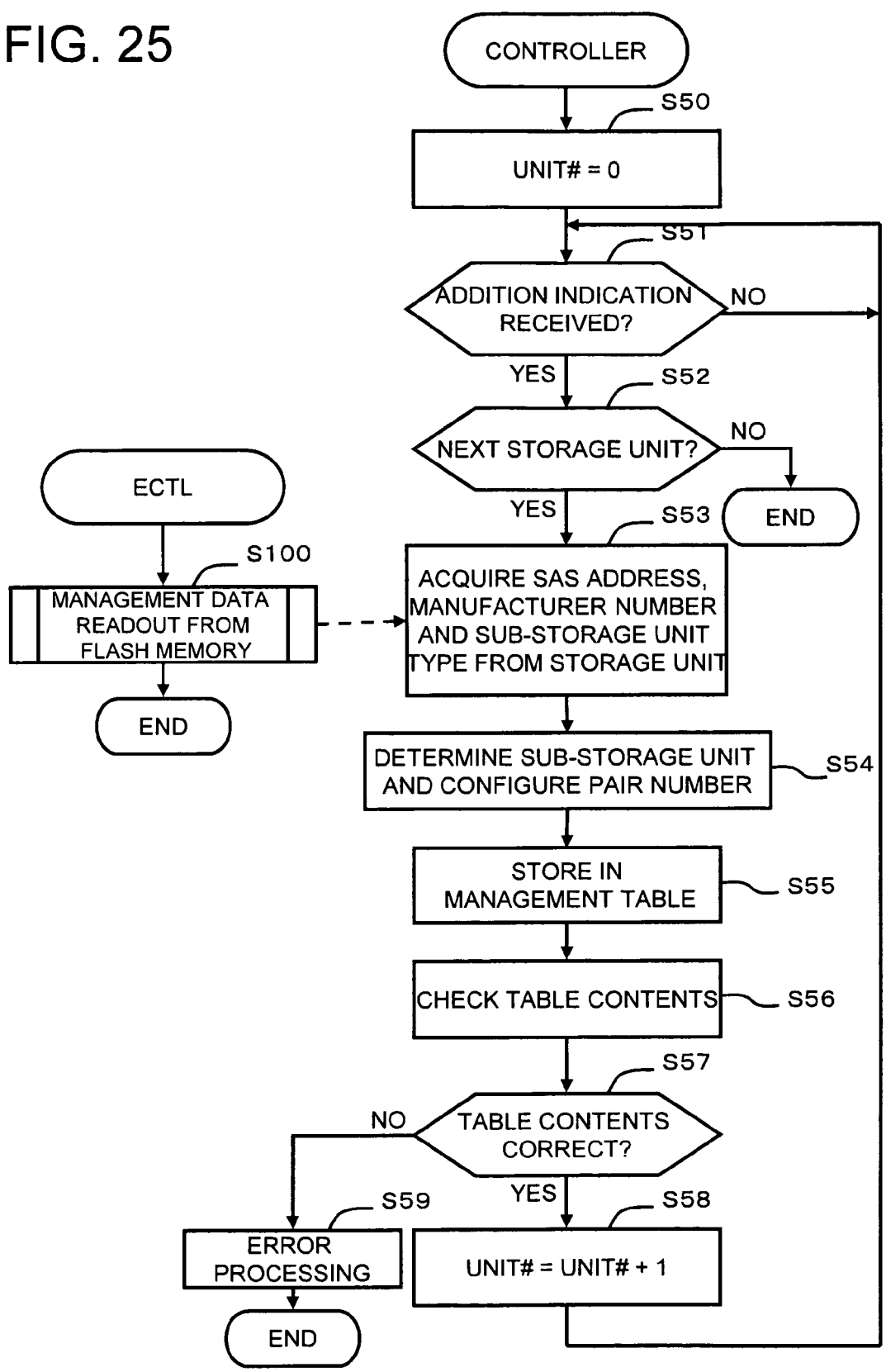
FIG. 25 is a flowchart of the table creation process executed when a storage unit has been added.

FIG. 25 is a flowchart showing the process when a new storage unit is added to the storage controller 10. The process when adding a new storage unit comprises the same steps as the startup process shown in FIG. 16. The difference between the addition processing and the startup process is that whereas the management table T10 is checked at the end in the startup process, in an addition process, the management table T10 is checked every time a storage unit is added.

The user uses the management program 61 of the host 60 to notify the storage controller 10 that a storage unit 40 (either a 40N or 40D) has been added. The controller 30 CPU 35 sets "0" in the unit number (S50), and determines whether or not an addition indication was received from the host 60 management program 61 (S51).

When an addition indication has been received (S51: YES), the CPU 35 determines whether or not a subsequent storage unit exists (S52). When there is no subsequent storage unit (S52: NO), this processing ends normally.

When a subsequent storage unit exists (S52: YES), the CPU 35 acquires the manufacturer number D10, sub-storage unit type D20 and SAS address D30 from the storage unit (S53), detects a pair of sub-storage units 50 on the basis of the manufacturer number, and configures a pair number for the detected pair (S54). Furthermore, when the CPU 35 recognizes from the SAS address and so forth that this storage unit is a sub-storage unit, the CPU 35 acquires the sub-storage unit type from this storage unit (S53). Further, when the CPU 35 recognizes from the SAS address and so forth that this storage unit is a sub-storage unit, the CPU 35 detects the sub-storage unit pair, and configures a pair number (S54).

The CPU 35 stores the manufacturer number acquired from the storage unit and the pair number decided in S54 in the management table T10 (S55), and subsequently refers to the prescribed rules to determine whether or not the contents stored in S55 are correct (S56).

When the contents of the management table T10 are correct (S57: YES), the CPU 35 increments the unit number by one (S58), and returns to S51. Consequently, the CPU 35 acquires the manufacturer number and so forth from the subsequent storage unit and stores same in the management table T10 (S51 through S55), and checks the storage contents (S56).

When the contents of the management table T10 violate a rule (S57: NO), the CPU 35 carries out error processing (S59). In error processing, the user is notified to the effect that the contents of the management table T10 are incorrect.

Thus, in an addition process in which storage units are added to the storage controller 10 one at a time, the contents of the management table T10 are checked every time a storage unit is added. Therefore, when the user gets the storage unit connection order wrong, this error can be notified to the user immediately, thereby enhancing usability.

Furthermore, the process for removing a storage unit that is mounted in the storage controller 10 is called a subtraction process. In this embodiment, a desired storage unit is removed from the rack 11 in a state in which the power supply to the storage controller 10 has been shut off. To maintain unit number continuity, storage units are removed in order from the storage unit located at the end connection. Then, after the storage unit has been removed, power is supplied and the storage controller 10 is started up. Consequently, the startup process shown in FIG. 16 is executed.

Figure 26:
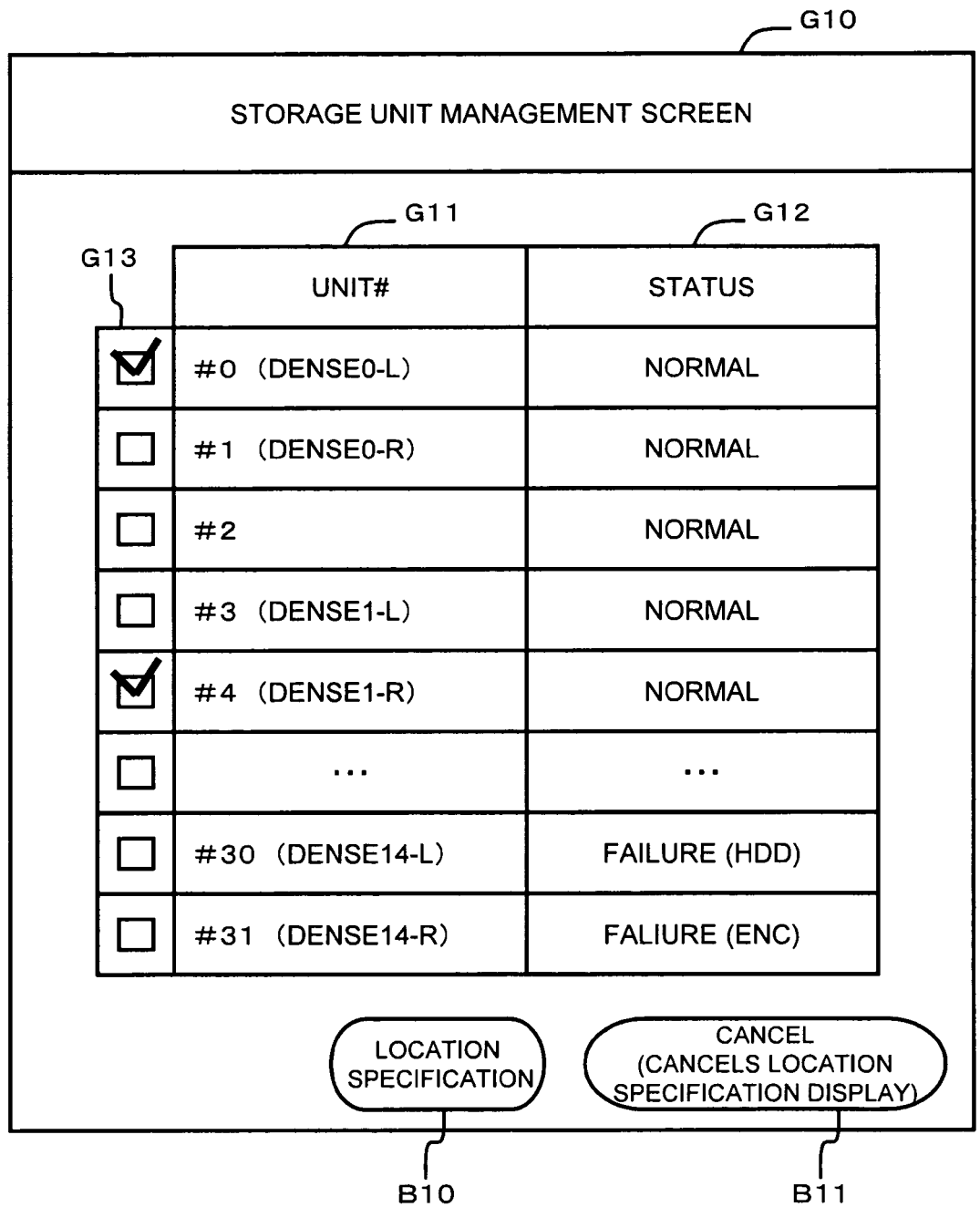
FIG. 26 is an illustration showing a management screen for checking the location of a storage unit.

FIG. 26 shows a management screen G10 for confirming the location of a storage unit. The management screen G10 is provided in accordance with the management program 61. In the management screen G10, for example, there is displayed a unit number column G11, status column G12, designation column G13, location specification button B10, and a cancel button B11.

The numbers of the respective storage units of the storage controller 10 are displayed in the unit number column G11. As explained hereinabove, in the case of a high-density storage unit 40D, two sub-storage units 50L, 50R are comprised therein, and a unit number is configured for each of the sub-storage units 50L, 50R.

The state of each storage unit is displayed in the status column G12. The states, for example, can include "normal" and "failed". In the case of failed state, information showing the place where the failure occurred can be included. The designation column G13 is for designating either one or a plurality of storage units. The user designates a storage unit by manipulating the designation column G13 box corresponding to the storage unit whose location is to be confirmed.

The location specification button B10 is for specifying the location of a storage unit. The cancel button B11 is for cancelling a location specification. Furthermore, instead of a graphical user interface like that shown in FIG. 26, or in addition to a graphical user interface, a user interface that makes use of voice recognition can also be utilized.

Figure 27:
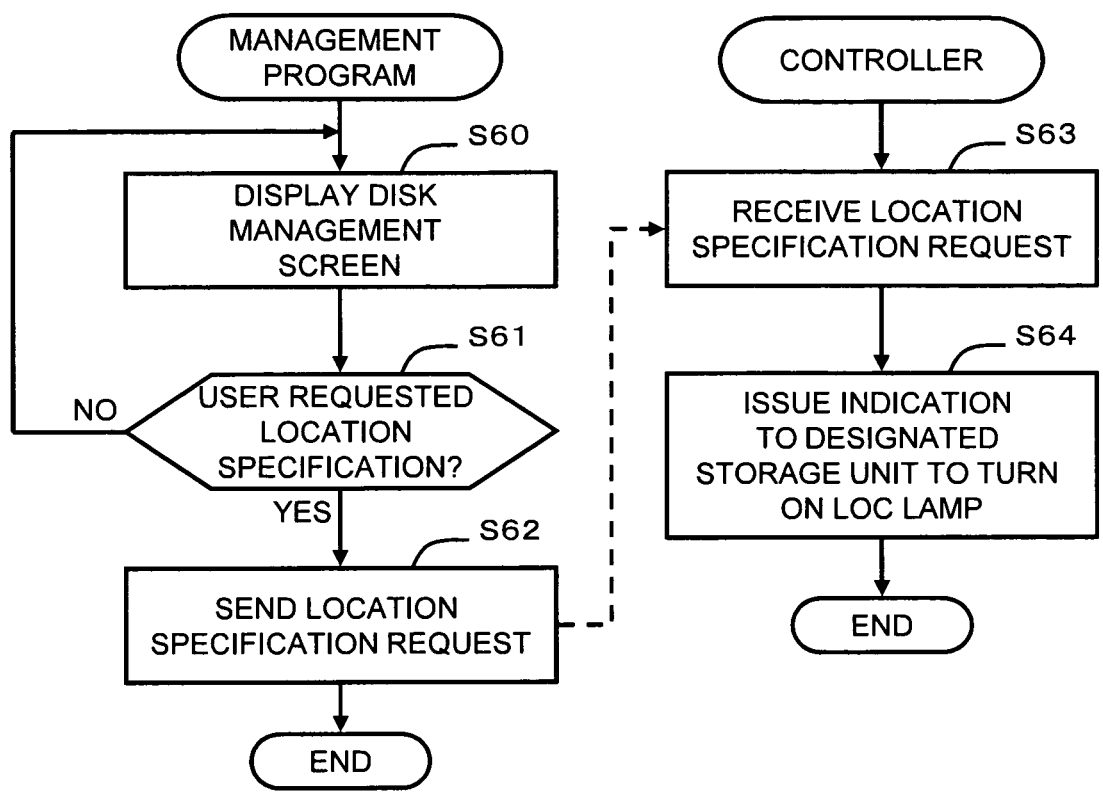
FIG. 27 is a flowchart showing the process for checking the location of a storage unit.

FIG. 27 shows the process for specifying a storage unit mount location. The management program 61 displays the management screen G10 shown in FIG. 26 in response to a user indication (S60). The management program 61 determines whether or not the user has operated the location specification button B10 (S61). When the user has operated the location specification button B10 (S61: YES), the management program 61 requests the controller 30 to specify the location of the storage unit (S62). This location specification request, for example, comprises the SAS address of the designated storage unit.

The controller 30 CPU 35, upon receiving the location specification request from the management program 61 (S63), issues an indication to the designated storage unit to light the location display lamp 57 (S64).

Consequently, the user can easily confirm where the desired storage unit is mounted in the rack 11. For example, when it is necessary to confirm the storage unit located at the end of the connection for a subtraction or addition process, the user can readily make this confirmation by causing the location display lamp 57 of the end storage unit to light up. Furthermore, in this embodiment, since a location display lamp 57 is provided for each individual sub-storage unit 50L, 50R, mount locations can be confirmed in sub-storage unit units.

By configuring this embodiment like this, a plurality of sub-storage units 50L, 50R, which operate independently of one another, is housed inside the high-density storage unit 40D. Therefore, it is possible to reduce the installation volume of the storage controller 10.

Figure 28:
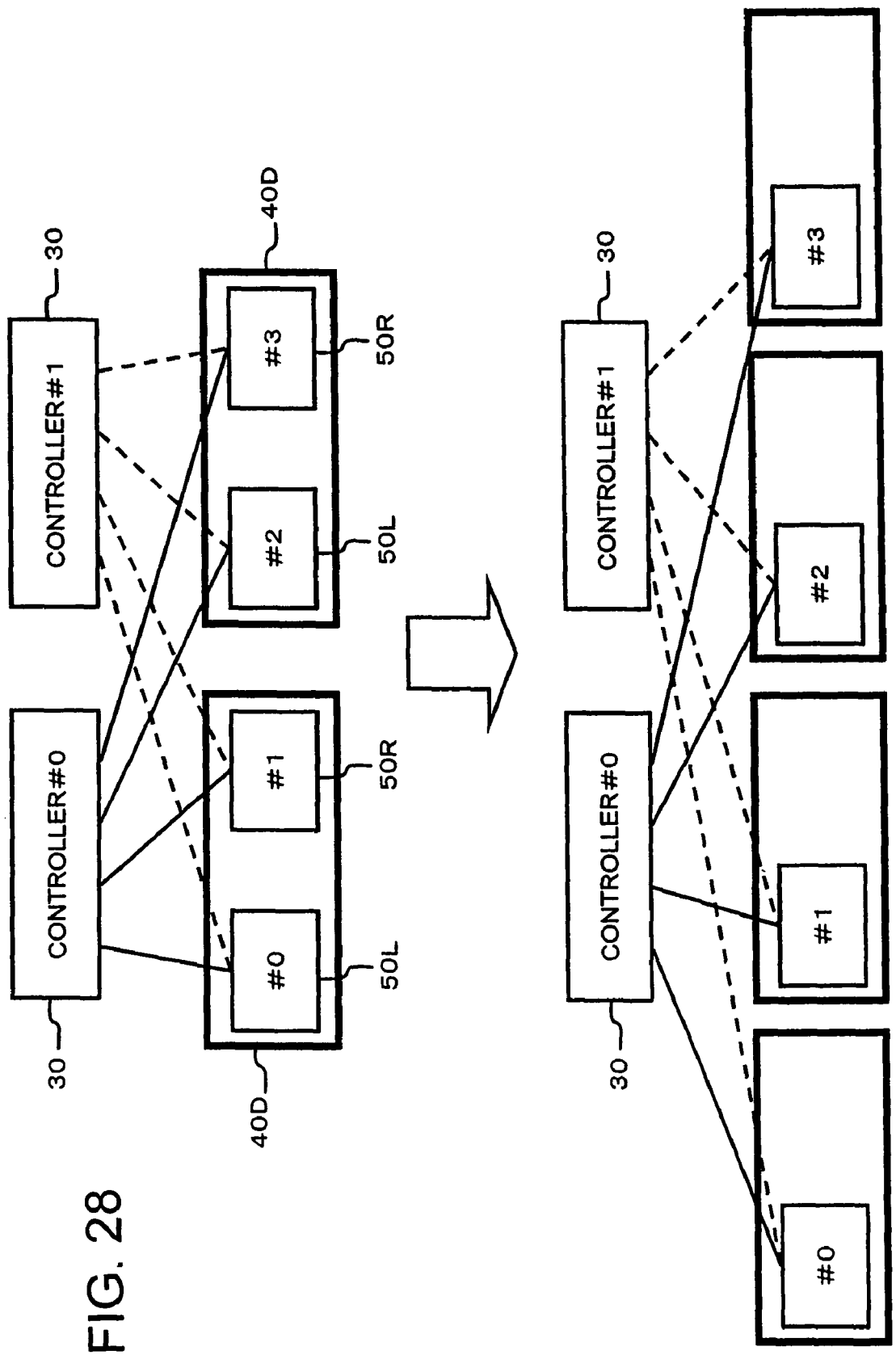
FIG. 28 is a diagram for illustrating the effects of this embodiment.

FIG. 28 is an illustration showing the effects of this embodiment. In FIG. 28, for instance, an example is given in which all four communication paths (SAS protocol chips 32) of one controller are used, and 96 hard disk drives 51 are utilized. All four communication paths are used to heighten access performance.

The high-density storage unit 40D of this embodiment comprises two sub-storage units 50L, 50R, and the respective sub-storage units comprise 24 hard disk drives 51 each. Therefore, in order to use 96 hard disk drives 51, two high-density storage units 40D can be utilized as shown in the upper portion of FIG. 28. If the height of a high-density storage unit 40D is hypothetically 4U, the total height when two high-density storage units 40D are housed in a rack 11 becomes 8U.

A case in which there are simply 48 drives inside the storage unit is also conceivable. The bottom portion of FIG. 28 shows a case in which the capacity of the storage unit has simply been increased. The large-capacity storage unit shown in the bottom portion of FIG. 28 is not presented as the prior art, but rather is presented for the sake of comparison.

A total of 96 hard disk drives can be utilized by using two large-capacity storage units housing 48 hard disk drives each. However, if the large-capacity storage units are treated as a single storage unit overall, and the number of drives is ignored, this storage unit is the same as the normal storage unit 40N. For this reason, it is not possible to effectively use four communication paths in the two large-capacity storage units, and only two communication paths are used. Therefore, access performance is greatly reduced.

Accordingly, to prevent a drop in access performance, only 24 hard disk drives are mounted in a large-capacity storage unit capable of housing 48 hard disk drives in the lower portion of FIG. 28. Then, all four communication paths of the one controller are used by utilizing four large-capacity storage units each housing only one half of the maximum number of hard disk drives capable of being mounted.

If four storage units mounted with only one half of the maximum mountable number of hard disk drives are mounted to a rack, and the height of one storage unit is 4U, the total height becomes 16U.

As described above, since the high-density storage unit 40D of this embodiment comprises sub-storage units 50L, 50R that operate independently of one another, the installed size of the storage controller 10 can be reduced, and the storage capacity of the storage controller 10 can be increased, making it possible to lower operating costs.

In this embodiment, a manufacturer number D10, sub-storage unit type D20 and SAS address D30 are stored in the respective sub-storage units 50L, 50R. Therefore, sub-storage units that respond with the same manufacturer number can be determined to be a pair. A pair can be detected with only the manufacturer number that is used in the normal storage unit 40N without using special data denoting which sub-storage units are paired.

In this embodiment, the manufacturer number D10 and SAS address D30 are selected from either high-density storage unit 40D data or normal storage unit 40N data. Therefore, the controller 30 can easily determine if the storage unit is a high-density storage unit 40D or a normal storage unit 40N based on either the manufacturer number D10 or the SAS address D30.

In this embodiment, the contents of the management table T10 are checked each time a storage unit is added, and the user is notified when an error is detected. Therefore, the user can quickly learn of a storage unit connection error, thus improving usability and maintainability.

In this embodiment, the manufacturer number D10 and so forth are stored inside a plurality of flash memories 523.

Therefore, the likelihood of a read error in which the manufacturer number cannot be read out at all can be reduced.

In this embodiment, a manufacturer number can be decided in accordance with majority rule even when none of the manufacturer numbers read out from a plurality of flash memories 523 match. The chances of being able to decide the manufacturer number can thus be improved, making it possible to heighten the reliability storage controller apparatus 10.

In this embodiment, location display lamps 57 are disposed in the high-density storage unit 40D so as to correspond to the respective sub-storage units 50L, 50R, and a location display lamp 57 is lighted based on an indication from the management program 61. Therefore, the user can easily confirm the location of a desired sub-storage unit, thereby enhancing usability.

The present invention is not limited to the embodiment described hereinabove. A person skilled in the art should be able to make various additions and changes without departing from the scope of the present invention.

What is claimed is:

1. A storage system comprising:
    a rack having a controller and a plurality of storage units controlled by the controller mounted therein,
    wherein the controller comprises a plurality of communication parts for communicating with the storage units respectively, and
    at least one or more of the storage units is configured as a first type storage unit, which comprises a casing and a plurality of sub-storage units disposed in the casing and operating independently of one another,
    the sub-storage units each respectively comprise a plurality of storage devices, a unit control part that is in charge of communicating with the storage devices and the respective communication part for the first type storage unit for the sub-storage unit, and a power supply device for supplying power to the storage devices and the unit control part of the sub-storage unit,
    each of the sub-storage units store casing management data that is configured in casing units for managing the casing of the first type storage unit for the sub-storage unit, address data that is configured in sub-storage unit units for the controller to cart3, out communications with the unit control part of the sub-storage unit, and differentiation data for differentiating between the sub-storage units in the casing of the first type storage unit for the sub-storage unit,
    the controller is configured to determine that sub-storage units of the plurality of sub-storage units that respond to the same casing management data are sub-storage units that belong to the same casing and manage the sub-storage units determined to belong to the same casing as a group,
    the plurality of storage units comprise at least one second type storage unit that differs from the first type storage unit, each second type storage unit comprises a casing, a plurality of storage devices disposed in the casing, a unit control part, which is disposed in the casing and is in charge of communications between the storage devices of the second type storage unit and the respective communication part for the second type storage unit, and a power supply device for supplying power to the storage devices and the unit control part of the second type storage unit, and
    each second type storage unit stores casing management data that is configured in casing units for managing the casing of the second type storage unit and address data that is configured in second type storage unit units for the controller to carry out communications with the unit control part of the second type storage unit;
    wherein the controller manages the first type storage units by uniquely specifying the sub-storage units based on a set of data comprising the casing management data, the address data and the differentiation data acquired from the sub-storage units, and, in addition, by making a corresponding management number correspond to each sub-storage unit specified by the set of data;
    wherein the casing management data, the address data and the differentiation data are redundantly stored in each sub-storage unit in a plurality of different storage areas, and when the plurality of the casing management data respectively read out from the plurality of storage areas do not match, the unit control part of the sub-storage unit determines the casing management data according to majority rule.

2. The storage system according to claim 1, wherein each first type storage unit includes more storage devices than each second type storage unit.

3. The storage system according to claim 1, wherein the differentiation data is stored in association with the casing management data by each sub-storage unit.

4. The storage system according to claim 1, wherein the casing management data configured for a first-type storage unit is selected from among data prepared beforehand as unique casing management data to be configured for the first-type storage unit.

5. The storage system according to claim 1, wherein the address data configured for the first-type storage unit is selected from among data prepared beforehand as unique address data to be configured for the first-type storage unit.

6. The storage system according to claim 1, wherein the communication parts are daisy chained together in a daisy chain connection with the storage units respectively, and the controller manages the storage units by setting management numbers in ascending order from the storage unit that is located closest to the controller in the daisy chain connection.

7. The storage system according to claim 1, wherein the controller determines whether the set of data acquired from the sub-storage units daisy chained at a current startup coincides with the set of data acquired at a previous startup, and outputs a warning when the set of data acquired at the current startup does not coincide with the set of data acquired at the previous startup.

8. The storage system according to claim 1, wherein, when a new storage unit that is a first type storage unit is connected, the controller determines whether or-not-this new storage unit is located at an end of the daisy chain connection, and outputs a warning upon determining that the new storage unit is located at the end of the daisy chain connection, and, upon determining that the new storage unit is located at the end of the daisy chain connection, carries out management and storage by adding a new management number that is consecutive with the current management numbers to each set of data acquired from the sub-storage units of the new storage unit.

9. The storage system according to claim 1, wherein, when a new storage unit that is a first type storage unit is connected, the controller makes a first determination as to whether the address data acquired from this new storage unit duplicates the address data of another storage unit, makes a second determination as to whether the casing management data and the differentiation data acquired from this new storage unit duplicate the casing management data and the differentiation data of another storage unit, and, in addition, makes a third determination as to whether or-not-the differentiation data acquired from this new storage unit has continuity with the storage unit that is connected at the end of the daisy chain connection from among the existing storage units from the standpoint of the arrangement of the sub-storage units in the casing of the new storage unit, and outputs a warning when an affirmative determination result is not obtained for any of the first determination, the second determination or the third determination.

10. The storage system according to claim 1, wherein a plurality of display parts corresponding to the sub-storage units respectively are provided in the casing of each first-type storage unit, and the unit control part of each first type storage unit activates the display part that corresponds to the sub-storage unit specified by the controller from among the display parts.

11. A storage controller, comprising a controller and a plurality of storage units that are controlled by the controller, wherein the controller comprises a plurality of communication parts for communicating with the storage units, and a storage part for storing a management table for managing the storage units, for the controller, the storage units are daisy chained so as to be distributed evenly for the communication parts, and, in addition, the controller sets consecutive management numbers to the storage units in accordance with a connection sequence, the storage unit comprises a casing and a plurality of sub-storage units, which are disposed in this casing and operate independently of one another, the sub-storage units comprise a plurality of storage devices, a unit control part that is in charge of communications between the storage devices and the communication part, and a power supply device for supplying power to the storage devices and the unit control part, the unit control part comprises a plurality of different memories, the memories respectively store, as prescribed data, casing management data, which is configured in casing units for managing the casing, address data, which is configured in the sub-storage unit units for the controller to carry out communications with the unit control part, and differentiation data for differentiating between the sub-storage units inside the casing, and the unit control parts, when the prescribed data respectively read out from the memories do not match, determine the data in accordance with majority rule, the controller, when the storage controller starts up and when a new storage unit is added and connected, creates a management table by respectively acquiring the prescribed data in order from the unit control part of the storage unit connected closest to the controller, checks the created management table on the basis of a prescribed rule, and carries out error processing when the management table is in violation of the prescribed rule, the controller also either checks the management table, when the storage controller starts up, on the basis of the prescribed rule after the creation of the management table has been completed, or checks on the basis of the prescribed rule the management table each time the prescribed data is acquired from the unit control parts and stored in the management table when a new the storage unit is added and connected, and the prescribed rule at least comprises (1) that the management numbers of the storage units be in consecutive order from a minimal value; (2) that the sub-storage units inside the same storage unit have consecutive management numbers; and (3) that the sub-storage units inside the same storage unit be connected in a prescribed order.

* * * * *